United States Patent [19]
Neale et al.

[11] Patent Number: 6,073,986
[45] Date of Patent: Jun. 13, 2000

[54] EASILY HANDLED MOVABLE VEHICLE SEAT ASSEMBLY

[75] Inventors: Colin G. Neale, Dearborn Heights; Philip W. Hadley, West Bloomfield; Eric M. Langensiepen, Beverly Hills, all of Mich.

[73] Assignee: Magna Interior Systems, Inc., Ontario, Canada

[21] Appl. No.: 09/041,667

[22] Filed: Mar. 13, 1998

Related U.S. Application Data

[60] Provisional application No. 60/040,573, Mar. 14, 1997, and provisional application No. 60/067,041, Dec. 4, 1997.

[51] Int. Cl.$^7$ ....................................................... B60N 2/00
[52] U.S. Cl. .................. 296/63; 296/65.01; 296/65.09; 296/65.16; 296/65.17
[58] Field of Search ............................. 296/65.01, 65.18, 296/65.16, 65.17, 65.09, 63

[56] References Cited

U.S. PATENT DOCUMENTS

| | | | |
|---|---|---|---|
| 1,894,103 | 1/1933 | Kuenzel . | |
| 2,136,972 | 11/1938 | Graunke . | |
| 2,357,729 | 9/1944 | De Fries | 5/118 |
| 2,582,687 | 1/1952 | Fisher | 296/65 |
| 3,431,018 | 3/1969 | Caron | 297/66 |
| 4,609,221 | 9/1986 | Bottcher . | |
| 4,637,648 | 1/1987 | Okino et al. | 296/63 |
| 4,984,822 | 1/1991 | Shimizu et al. | 296/65.01 |
| 5,044,683 | 9/1991 | Parsson | 296/65.01 |
| 5,273,336 | 12/1993 | Schubring et al. | 296/65.01 |
| 5,741,046 | 4/1998 | Leuchtmann et al. | 296/65.01 |

FOREIGN PATENT DOCUMENTS

| | | |
|---|---|---|
| 0736412A1 | 10/1996 | European Pat. Off. . |
| 2663270 | 12/1991 | France . |
| 2668990 | 5/1992 | France . |
| 3312118 | 9/1994 | Germany . |
| 19628699A1 | 1/1998 | Germany . |

Primary Examiner—D. Glenn Dayoan
Assistant Examiner—Lori L. Coletta
Attorney, Agent, or Firm—Howard & Howard

[57] ABSTRACT

A vehicle seat assembly includes a seat cushion assembly having a seat cushion frame structure. The seat cushion assembly is constructed and arranged to be mounted within the motor vehicle in an operative position wherein an occupant can be seated thereon. A seat back assembly having a lightweight seat back frame structure is constructed and arranged to be mounted within the motor vehicle in an operative position to support the back of an occupant seated on the seat cushion assembly. The seat back frame structure is associated with the seat cushion frame structure to form a cushion associated seat frame structure to be connected with and extend between the side walls of the motor vehicle when the seat cushion assembly and seat back assembly are in the operative positions. The cushion associated frame structure is constructed and arranged so that force applied thereto by an occupant during conditions of sudden acceleration or deceleration are resisted by the seat cushion assembly and seat back assembly by virtue of the connection thereof with the side wall of the motor vehicle.

77 Claims, 16 Drawing Sheets

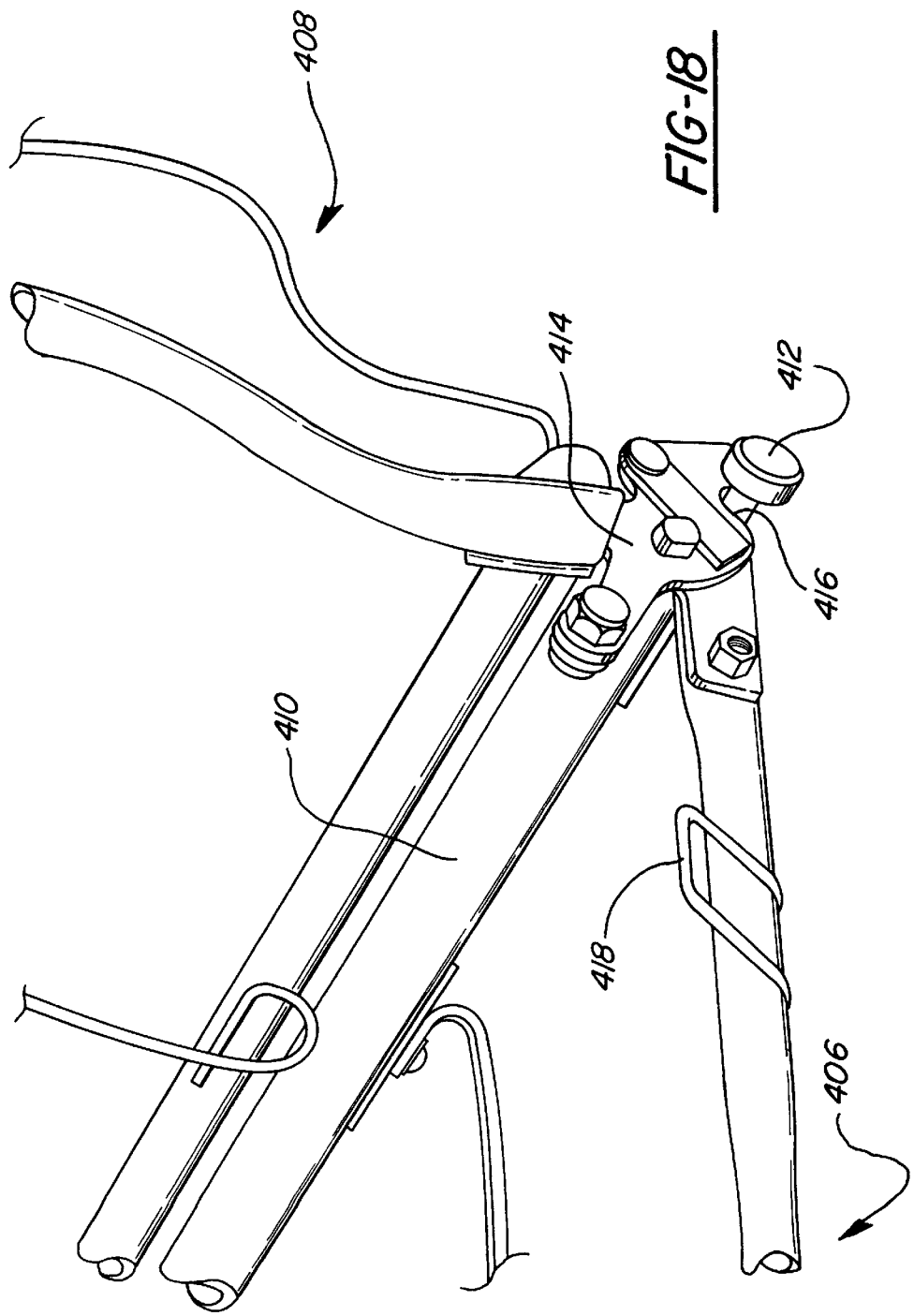

EASILY HANDLED MOVABLE VEHICLE SEAT ASSEMBLY

This application claims the benefit of U.S. Provisional Applications Nos. 60/040,573, filed Mar. 14, 1997 and 60/067,041 filed Dec. 4, 1997.

FIELD OF THE INVENTION

The present invention relates to a vehicle seat assembly for use in a motor vehicle and more particularly to seat assemblies of the type utilized in vans, sports vehicles and the like.

BACKGROUND OF THE INVENTION

The nature of vans, sports utility vehicles and the other vehicles similar thereto is that it is frequently desirable for the user to convert the space within the back of the vehicle from a seat accommodating space to a cargo accommodating space. This situation arises more often in vans than in most other types of motor vehicles meant primarily as a transportation vehicle due to the suitability of vans for the transport of cargo. In order to convert the seat accommodating space into a cargo accommodating space it becomes necessary to handle the seat assembly.

An important factor concerning the ease of handling the seat assembly is its weight. Weight reduction, however, cannot be achieved by sacrificing the strength of the seat to adequately protect the occupant in an emergency situation. There exists a need to provide a seat assembly which will more effectively balance the ease of handling by weight reduction and the need to provide sufficient strength to protect the occupant.

One prior art reference, U.S. Pat. No. 2,582,687, proposes a manner for mounting a vehicle seat for movement to a storage position within the interior of the vehicle. The '687 patent discloses a motor vehicle having a seat assembly in the rear compartment thereof which is moveable from an operative position wherein it can receive occupants seated thereon and a storage position wherein both the seat back assembly and the seat cushion assembly are unfolded in an extended manner and supported alongside the roof of the vehicle. The seat back assembly and the seat cushion assembly of the '687 patent are slidably mounted on a set of guide tracks which allow the seat assembly to slide upward along the rear wall of the vehicle to an unfolded position alongside the roof. Such a manner of mounting, however, does not provide a desirable balance between weight and strength.

SUMMARY OF THE INVENTION

It is therefore an object of the present invention to satisfy the need expressed above. In accordance with the principles of the present invention, this objective is obtained by providing a vehicle seat assembly which achieves such desirable advantages. The present invention is a vehicle seat assembly for use in a motor vehicle having an interior structure including a bottom floor, transversely spaced side walls, and an upper roof defining an interior space therein within which the vehicle seat assembly can be mounted. The vehicle seat assembly comprises a seat cushion assembly having a seat cushion frame structure. The seat cushion assembly is constructed and arranged to be mounted within the interior space of the motor vehicle in an operative position wherein an occupant can be seated thereon. A seat back assembly has a lightweight seat back frame structure. The seat back assembly is constructed and arranged to be mounted within the interior space of the motor vehicle in an operative position to support the back of an occupant seated on the seat cushion assembly.

The seat back frame structure includes elongated transversely spaced frame members constructed and arranged to be connected with the interior structure of the motor vehicle at upper portions thereof and extend downwardly therefrom when the seat back assembly is in the operative position thereof. The seat back frame structure is associated with the seat cushion frame structure to form a cushion associated seat frame structure disposed below upper portions of said transversely spaced frame members when the seat cushion assembly and seat back assembly are in the operative positions thereof.

The cushion associated seat frame structure is constructed and arranged to be connected with and extend between lower portions of the side walls of the motor vehicle when said seat cushion assembly and seat back assembly are in the respective operative positions thereof. The cushion associated frame structure is also constructed and arranged so that force applied thereto by an occupant during conditions of sudden acceleration or deceleration are resisted by the cushion associated frame structure by virtue of the connection thereof with the side walls of the motor vehicle.

In such a seat assembly according to the principles of the present invention, it is preferable that the seat cushion assembly and seat back assembly are disposed in spaced vertical relation to the floor of the motor vehicle when in the respective operative positions thereof. To ensure that the forces applied to the seat assembly are transmitted to the side walls of the vehicle without unnecessarily increasing the weight of the cushion associated frame structure, the cushion associated frame structure includes an elongated tensile structure constructed and arranged to be connected with and extend between the side walls of the motor vehicle when the seat cushion assembly and seat back assembly are in the respective operative positions thereof. The cushion associated frame structure is constructed and arranged such that force applied to the cushion associated frame structure caused by an occupant during conditions of sudden acceleration or deceleration results in bending of the cushion associated frame structure within the elastic limit of the material thereof. The tensile structure is constructed and arranged such that the aforesaid bending of the cushion associated frame structure applies tension to the tensile structure when connected between the side walls of the motor vehicle to thereby resist further bending of the cushion associated frame structure caused by the occupant during condition of sudden acceleration or deceleration.

The broadest aspects of the present invention may be used in various kinds of vehicle seat assemblies. For example, the principles of the present invention may be used in the seat assembly which can be removed or rolled out of the rear of the van, an example of which is disclosed in commonly owned U.S. Provisional Patent Application Ser. No. 60/067, 497, the entirety of which is hereby incorporated into the present application by reference.

It is preferable that the vehicle seat assembly of the present invention can be manipulated so that the seat cushion assembly and seat back assembly can be stored in storage positions within the interior of the vehicle. It is an objective of the present invention to provide a seat assembly embodying the broad principles of the present invention described above wherein the seat cushion assembly is moveably mounted to the seat back assembly such that the seat cushion assembly can be moved when the seat back assembly is in the operative position thereof to a folded position with respect to the seat back assembly wherein the seat cushion assembly is disposed alongside the seat back assembly.

The transversely spaced frame members of the seat back frame structure are constructed and arranged to be pivotally attached to the interior structure of the motor vehicle at the upper portions thereof such that the seat cushion assembly can be moved to the folded position thereof alongside the seat back assembly and thereafter the seat back assembly together with the seat cushion assembly can be swung upwards to be retained in respective storage positions wherein the seat cushion assembly and seat back assembly are disposed alongside the roof of the motor vehicle in vertically spaced relation to the floor of the motor vehicle.

Preferably, the cushion associated frame structure is constructed and arranged to establish a connection with the side walls of the motor vehicle as the seat cushion assembly is moved from the folded position thereof to the operative position thereof after the seat back assembly has been swung downwards to the operative position thereof to thereby retain the seat cushion assembly and seat back assembly in the respective operative positions thereof.

Additionally, a yieldable cushion supporting structure may be provided which is configured to be connected between the transversely spaced frame members of the seat back frame structure and the interior structure of the motor vehicle. The yieldable cushion supporting structure is constructed and arranged such that (1) the yieldable cushion supporting structure can yieldingly support the seat cushion assembly and seat back assembly in the respective releasable storage positions thereof alongside the roof of the motor vehicle after the seat cushion assembly and seat back assembly have been released and (2) the yieldable cushion support structure can control downward movement of the seat cushion assembly and seat back assembly as they are being swung downwardly from the respective storage positions thereof.

It is further contemplated that the broadest principles of the present invention may be applicable to vehicle seat assemblies in which the seat cushion assembly is stored within the floor of the motor vehicle and the seat back assembly is stored alongside the roof, rather than storing both seat cushion assembly and seat back assembly alongside the roof. An example of such a seat assembly is disclosed in a U.S. Provisional Application entitled "Split Swing Seat", invented by Colin Neale and Eric Langensiepen, which is being filed on the same date as the present application and is hereby incorporated into the present application by reference.

DESCRIPTION OF THE DRAWINGS

FIG. 18 is a fragmentary perspective view of an alternative construction for pivotally connecting the seat cushion assembly to the seat back assembly.

DETAILED DESCRIPTION OF THE FIRST EMBODIMENT SHOWN IN THE DRAWINGS

Figure 1:
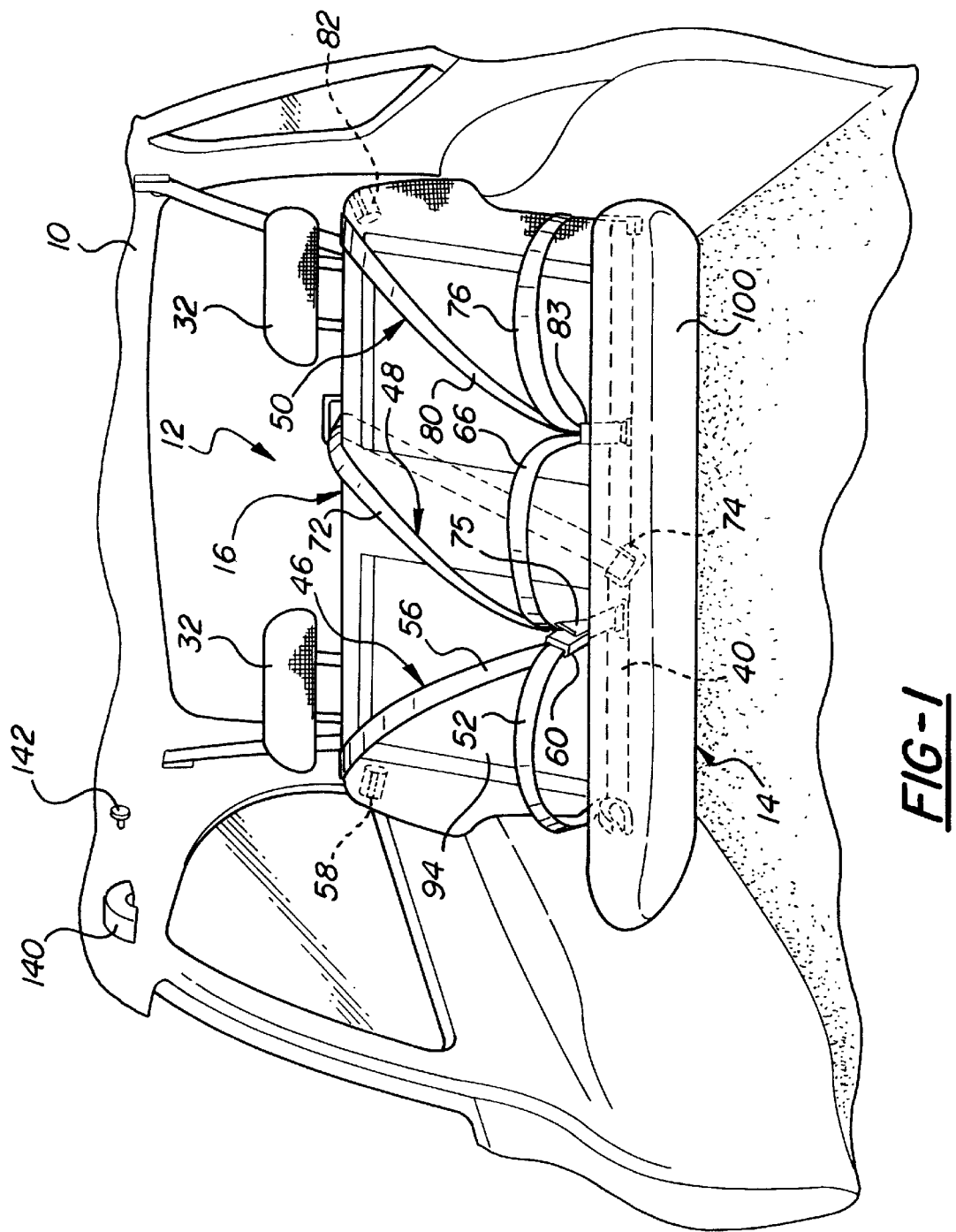
FIG. 1 is a fragmentary perspective view showing the inner rear of a van vehicle with a vehicle seat assembly embodying the principles of the present invention mounted in an operative position therein.

Referring now more particularly to the drawings, there is shown in FIG. 1 a fragmentary view of the interior rear end of a van vehicle 10 having an interior structure including a lower floor, an upper roof, and transversely spaced sidewalls defining an interior space within which a vehicle seat assembly, generally indicated at 12, constructed in accordance with the principles of present invention is mounted in an operative position in spaced relation above the floor of the vehicle. The seat assembly 12 is made up of two subassemblies; namely, a seat cushion assembly, generally indicated at 14, and a seat back assembly, generally indicated at 16.

In accordance with the principles of the present invention, the seat cushion assembly 14 and seat back assembly 16 are pivotally interrelated to one another so that the seat cushion assembly 14 is capable of being pivoted about a transverse horizontal axis from a seat cushion operative position into an intermediate or folded position alongside the seat back assembly 16 so that a seating surface of said seat cushion assembly is disposed alongside and facing a back supporting surface of the seat back assembly 16.

Figure 2:
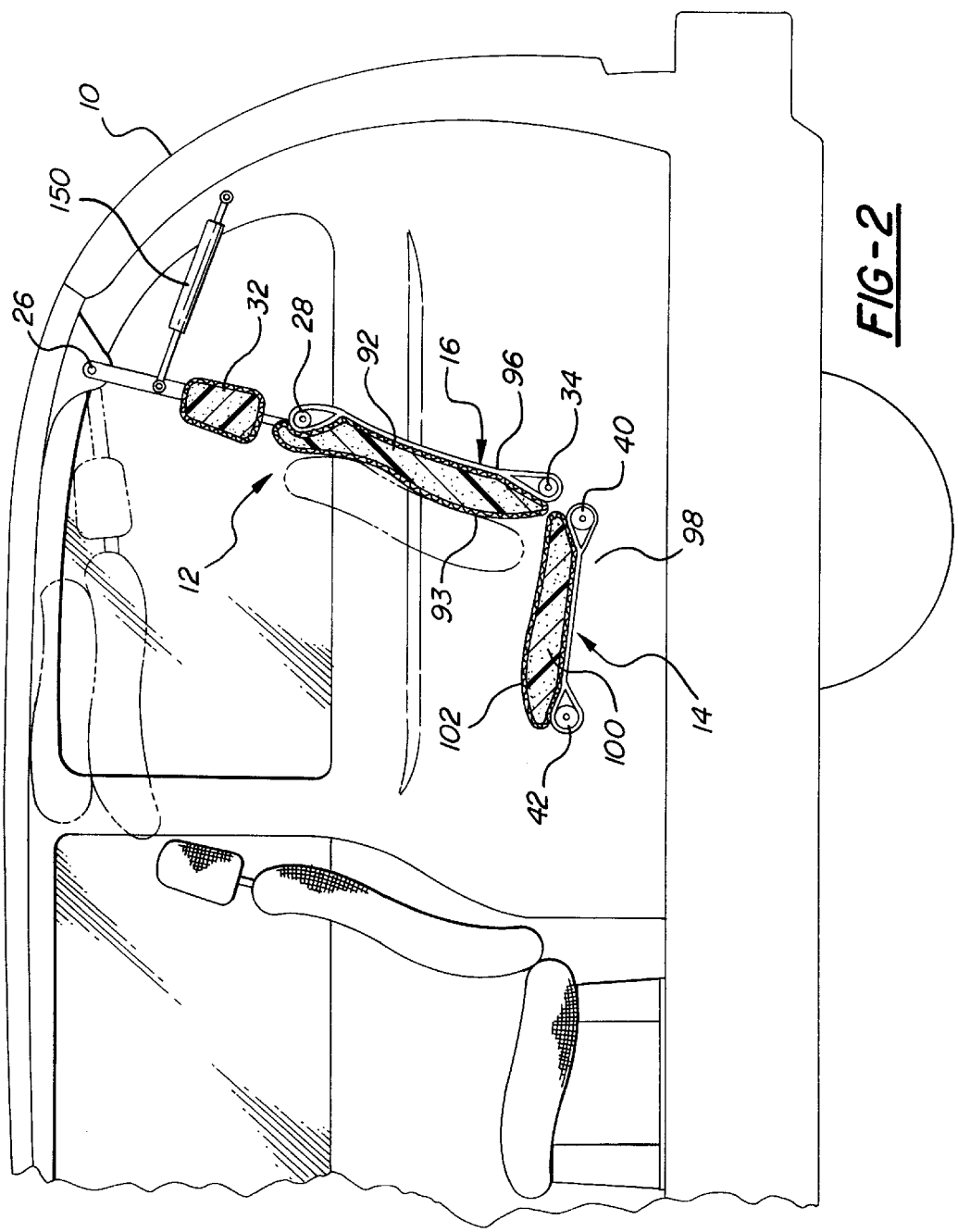
FIG. 2 is a profile view of the van vehicle in vertical section showing the seat assembly in its operative position in solid lines, the seat cushion assembly in its seat cushion storage position in phantom lines, and the roof storage position of the entire seat assembly being shown in dotted lines.

Also in accordance with the principles of the present invention, the seat back assembly 16 is mounted in the vehicle 10 for swinging movement from (1) a seat back operative position in which the seat back assembly 16 extends downwardly with respect to the roof of the motor vehicle such that the seat cushion assembly 14 can be moved to its seat cushion operative position and (2) a storage position wherein the seat cushion assembly 14 is pivoted into its folded position alongside the seat back assembly 16 and both are swung upwardly into storage positions alongside the roof of the vehicle. The operative position is shown in FIGS. 1 and 2 in solid lines and the storage positions are shown in dotted lines in FIG. 2 and in solid lines in FIG. 3. As can be seen in the Figures, the bottom surface of the seat cushion assembly 14 is preferably disposed adjacent to the roof when the seat back assembly 16 is swung up into the roof storage position.

In view of the roof-storage position of the seat assembly 12, it is highly desirable that the weight of the seat assembly be reduced as much as possible commensurate with good safety and comfort practices. Moreover, since the seat assembly 12 functions as the rear seat in a van-type vehicle 10, the seat assembly 10 is sized to accommodate three occupants in side-by-side relation. It is to be understood, however, that the principles of the present invention may be applied to a one or two passenger seat. Finally, seat belt assemblies for the three occupants are contemplated to be carried by the seat assembly 12 itself.

Figure 4:
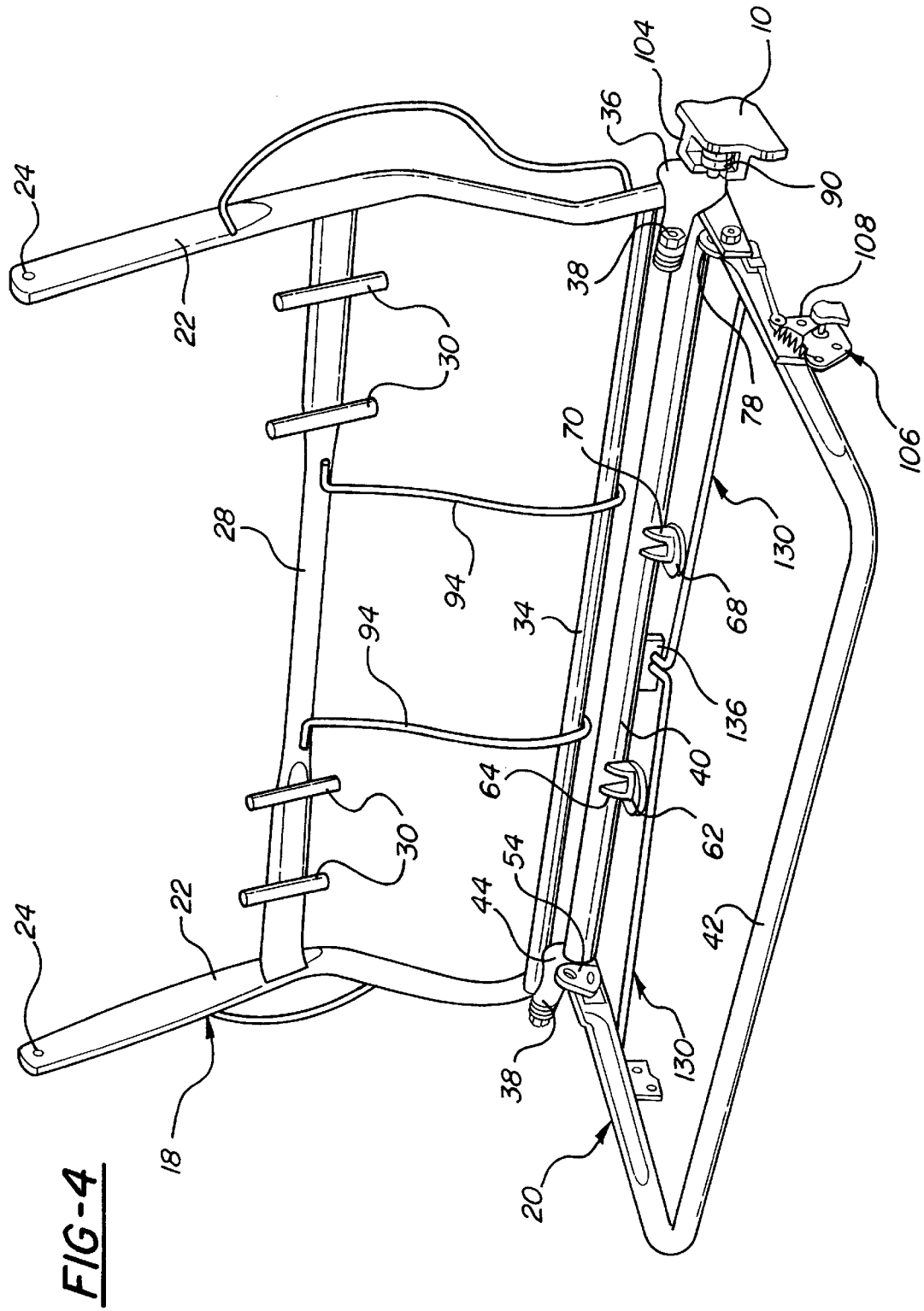
FIG. 4 is a perspective view of the frame assembly of the seat assembly shown in FIG. 1.

All of these factors make weight reduction difficult to achieve. To this end, the seat assembly 12 includes a lightweight seat back cushion frame assembly, generally indicated at 18, and a lightweight seat cushion frame assembly, generally indicated at 20, which is pivotally mounted to the seat back cushion frame assembly 18. Together, the seat cushion and seat back cushion frame assemblies 20, 18 define a cushion associated frame structure. As best shown in FIG. 4, the seat back cushion frame assembly 18 includes a pair of transversely spaced side frame members 22 connected to the interior structure of the vehicle at upper portions thereof and extending downwardly therefrom when the seat back assembly 16 is in the operative position thereof. These side frame members 22 are of tubular construction with the upper portions thereof being pressed together so as to enable the upper extremities to be bored as indicated at 24 in FIG. 4 to receive pivot pins 26. As shown in FIG. 2, the pivot pins 26 are mounted on the frame or interior structure of the vehicle 10 near or on the roof. The pins 26 go through the openings 24 and serve to pivotally mount the seat back frame assembly 18 for swinging movement between the operative position and the roof-storage position thereof.

Extending between the mid-portion of the two side frame members 22 is an upper horizontal frame member 28 which carries a series of tubes 30 for adjustably receiving a pair of head restraint assemblies 32. Extending between the lower extremities of the vertical frame members 22 is a lower horizontal frame member 34, the ends of which are connected to the lower ends of the side frame members 22 which, in turn, are fixed to a bracket plate 36 which extends forwardly to receive a hinge or pivot pin 38.

The seat cushion frame assembly 20 includes tensile structure in the form of a main horizontal frame member 40 which is of tubular construction formed of a suitable lightweight structural metal and a U-shaped tubular frame member 42 extending from opposite ends thereof so as to define an essentially rectangular frame. Fixed to each end of the main frame member 40 is a bracket plate 44 which is apertured to receive an associated pivot pin 38. In this way, the pivot pins 38 cooperate with the bracket plates 36 and 44 to effect the pivotal mounting of the seat cushion assembly 14 to the seat back assembly 16.

As best shown in FIG. 1, the seat assembly 12 includes for the three occupants three separate seat belt assemblies, generally indicated at 46, 48 and 50. The right-hand seat belt assembly 46 includes a lap belt 52 which is suitably fixed at one end to a connecting member 54 which, in turn, is fixed to the right-hand free leg of the U-shaped frame member 42. The opposite end of the lap belt 52 is connected with one end of a shoulder belt 56 which extends from a reel assembly 58 carried by the seat back frame assembly at a position adjacent the juncture of the right-hand side frame member 22 and upper frame member 28. The interconnected lap and shoulder belts 52 and 56 are provided with a latch element which enters a releasable latch receiving assembly 60 fixed to the end of a short belt which is fixed to a connecting member 62 which, in turn, is fixed to a bracket 64. Bracket 64 is fixed, as by welding or the like, to the exterior surface of the main frame 40 at a position spaced from the adjacent end thereof.

Similarly, the central or middle belt assembly includes a lap belt 66 which is fixed at one end to connecting member 68 which, in turn, is connected to a bracket 70 fixed, as by welding or the like, to the exterior surface of the main tubular frame member 40 in spaced relation to the bracket 64. The lap belt has its opposite end connected with a shoulder belt 72 which extends over the central portion of the upper frame member 28 and downwardly to a reel assembly 74 fixedly carried by the main tubular frame member 40. As before, the end of the lap belt 66 at its connection with the shoulder belt 72 is provided with a latch element operable to enter a releasable latch receiving assembly 75 fixed on a short belt suitably fixed to the connecting member 64.

Finally, the left-hand belt assembly 50 includes a lap belt 76 which is fixed at one end to a connecting member 78 which, in turn, is suitably fixed to the left-hand end portion of the U-shaped frame member 42. The lap belt 76 has its opposite end affixed to the adjacent end of a shoulder belt 80 which extends from a reel assembly 82 fixed to the upper end of the seat back frame assembly 18 at the juncture between the upper frame member 28 and the left hand side frame member 22. As before, the interconnected ends of the lap belt and shoulder belts 76 and 80 are provided with a latch element which enters a releasable latch receiving assembly 83 carried by a short belt which is fixed to the connecting member 68. Optionally, the shoulder belt 72 of the middle belt assembly 48 can be eliminated. From the above, it can be seen that the seat belt assemblies 46, 48 and 50 are of conventional reel-type construction and that any other conventional type may be utilized so long as the connection with the seat assembly 12 is the same.

In the event of an accident such as a head-on collision, the forward thrust of the seat occupants is resisted by the seat belt assemblies 46, 48 and 50. The stress thus imposed on the seat belt assemblies is, in turn, transmitted to the main frame member 40 by the connecting members 54, 62, 68 and 78. The forces transmitted to the connecting members 62 and 68 will cause the main tubular frame member 40 to bend in a forward direction within an elastic limit of the material thereof.

Figure 5:
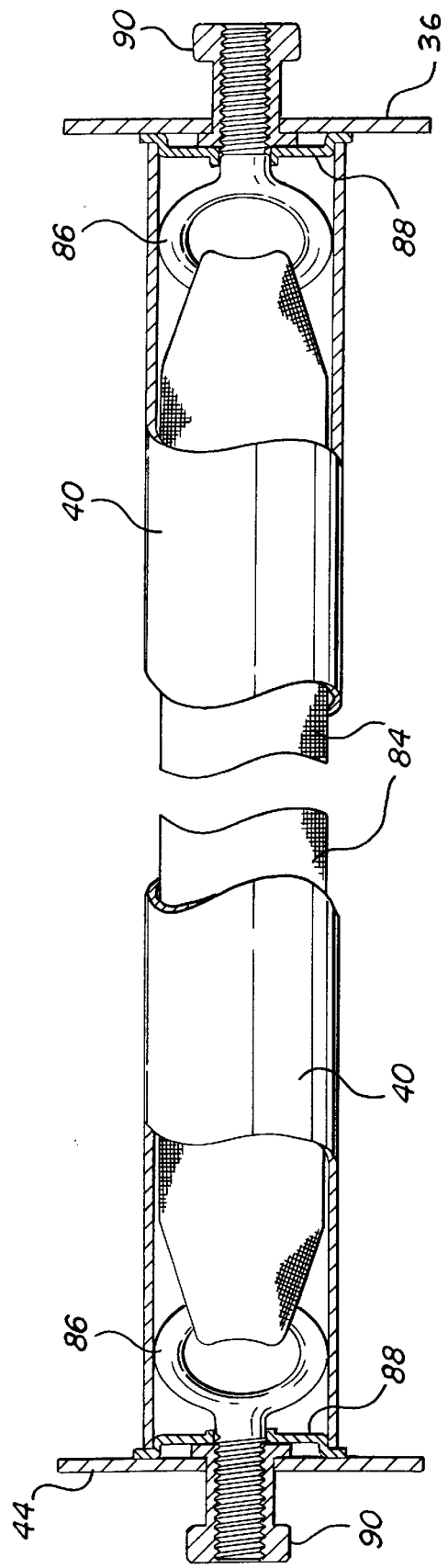
FIG. 5 is an enlarged fragmentary sectional view showing an end portion of the main cross frame member of the frame assembly.

Instead of providing the tensile structure in the form of main frame member 40 with a thicker wall and the added weight thereof to resist this bending action, a tensile element 84 is mounted within the interior of the main frame member 40. As best shown in FIG. 5, the tensile element is a preferably flexible member in the form of a belt having a construction like a seat belt. It will be understood that other tensile elements may be utilized such as ropes, chains, cables and the like. The seat belt tensile element 84 is preferred because of its strength to weight ratio. Furthermore, it should be understood that the location of the tensile structure is not limited to the seat cushion frame structure 20.

As shown in FIG. 5, the tensile element 84 has its opposite ends connected to tensile element mounting structure in the form of eye bolts 86 extending inwardly through openings in recessed end caps 88 and the bracket plates 44. The outwardly extending end of each eye bolt 86 is threaded to receive a tensile force transmitting pin in the form of a nut 90. The two nuts 90 are turned in operative relation with the eye bolts 86 with a tightness just sufficient to maintain the tensile element 84 taut under normal circumstances without any significant pressure being applied thereto. Under a stress condition, however, where bending forces are applied to the main tubular frame member 40, the bending stresses are resisted by the tensile forces which build up into the tensile element 84 by virtue of the bending action which is taking place. This resistance to the bending action provides the necessary strength to resist the peak load conditions with a construction which is considerably less in terms of overall weight than would be required in a simple structural member.

In other words, according to the broadest principles of the present invention the cushion associated frame structure is constructed and arranged such that force applied to the cushion associated frame structure caused by an occupant during conditions of sudden acceleration or deceleration results in bending of the cushion associated frame structure within the elastic limit of the material thereof. The tensile structure of the present invention is constructed and arranged such that the aforesaid bending of the cushion associated frame structure applies tension to the tensile structure when connected between the side walls of the vehicle to thereby resist further bending of the cushion associated frame structure caused by the occupant during conditions of sudden acceleration and deceleration. It is to be understood that the tensile element alone could suffice to satisfy the broad functional principles of the tensile structure of the present invention.

The seat back assembly 16 includes in conjunction with the seat back frame assembly 18 a thin foam cushion 92 covered with a suitable cover 93. To enable the foam cushion 92 and cover 93 to be minimized in bulk and weight, a seat back suspension membrane 96 made of a canvas-like material is fixed between the side frame members 22 and the upper and lower frame members 28 and 34. A pair of spring-like elongated stabilizing elements 94 are mounted between the upper and lower frame members 28 and 34 to aid in the support of the suspension membrane 96. Similarly, a suspension membrane 98 is mounted between the main frame member 40 and the U-shaped frame member 42 to receive thereon an abbreviated foam cushion 100 suitably covered by a cover 102. As before, a pair of stabilizing elements may be provided between the members 40 and 42 to aid in supporting the suspension membrane 98, if desired. Preferably, as best seen in FIG. 2, the seating surface of the seat cushion assembly 14 has a contour and the back supporting surface of the seat back assembly 16 has a contour complementary to the contour of the seating surface such that the seat cushion assembly and seat back assembly 14,16 have a reduced vertical profile when they are in the storage positions thereof alongside the roof of the motor vehicle so that the drivers' rearward vision is not unduly limited.

Referring now more particularly to FIGS. 1, 3, 6 and 7, the seat assembly 12 is selectively retained in its operative position by means of a pair of pin receiving structures 104 fixed to the side walls of the vehicle 10. As is evident from FIG. 5, the tensile force transmitting pins in the form of nuts 90 have a knob-like configuration and the pin receiving structures 104 are essentially C-shaped so as to receive both the knob end as well as the shank of the nuts 90. The nut receiving structures 104 serve to resist inward movement of the tensile element of the tensile structure when tension is applied thereto whereas the retention function is performed by a pair of latch assemblies, generally indicated at 106, fixed to opposite sides of the U-shaped frame member 42 in depending relation thereto. The latch assemblies 106 serve as both operative position retaining structure to retain the seat cushion assembly and seat back assembly 14, 16 in their respective operative positions and seat back storage retaining structure to retain the seat back assembly 16 in the roof storage position with the seat cushion assembly 14 in its seat cushion storage position also alongside the roof.

The latch assemblies 106 are adapted to receive and retain a pair of knob-like supporting pins 108 fixed to the sides of the vehicle 10 in forwardly spaced relation to the nut-receiving structures 104.

Figure 6:
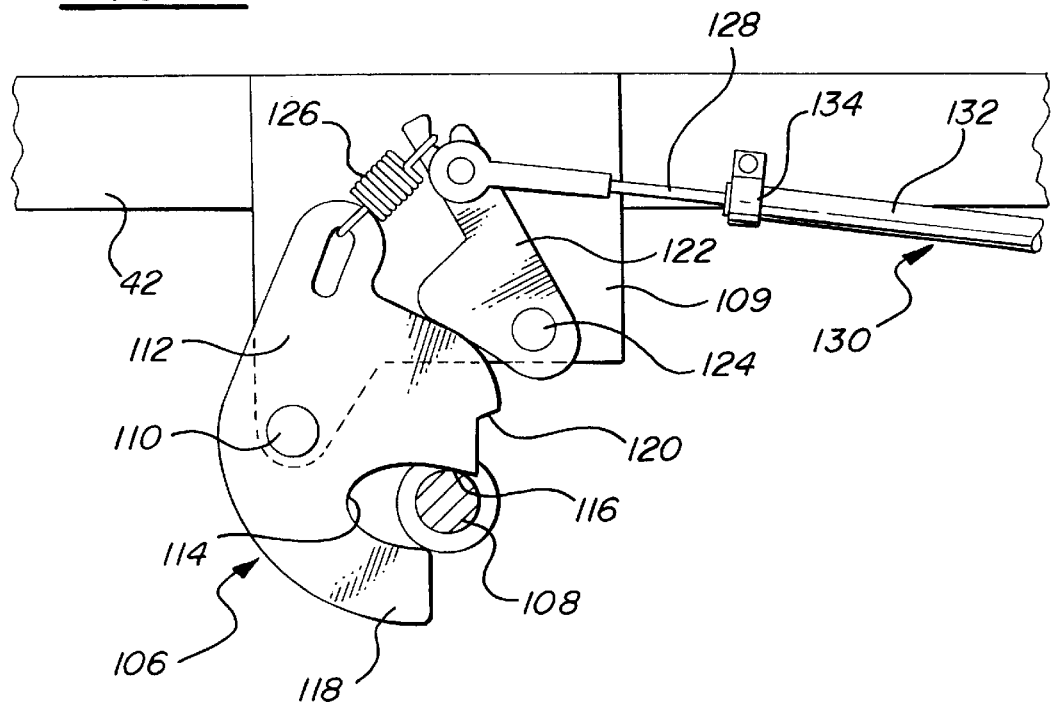
FIG. 6 is a fragmentary side elevational view of the latch assembly for the seat assembly showing the position of the components of the latching mechanism just prior to being moved into latched relation.
Figure 7:
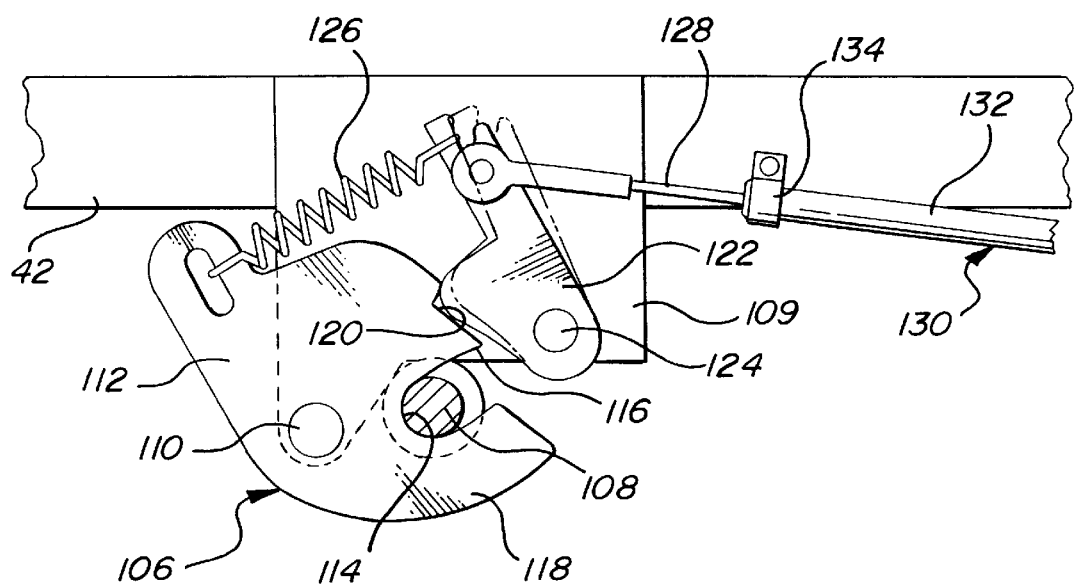
FIG. 7 is a view similar to FIG. 6 showing the same in locked position with the releasing position shown in dotted lines.

As best shown in FIGS. 6 and 7, each latch assembly 106 consists of a mounting plate 109 suitably fixed to the exterior surface of the associated leg of the U-shaped frame member 42 in depending relation. Affixed to each mounting plate 109 at a lower end portion thereof is a pivot pin 110 on which is mounted a latch member 112. Each latch member 112 includes a forwardly opening pin-receiving slot 114 which provides a downwardly facing pin-engaging surface 116 which extends beyond a lower jaw-like portion 118 of the latch member 112.

Formed in the rearward face of each latch member 112 is a locking surface 120 which is adapted to be engaged by a locking member 122 which is pivotally mounted on the mounting plate 110 by a pivot pin 124 disposed parallel with the pivot pin 110. A suitable biasing structure in the form of a tension coil spring 126 is mounted between an upper end of each locking member 122 and an upper end of each latch member 112. In addition, the upper end of each locking member 122 is connected to one end of a cable 128 forming a component of a Bowden wire assembly, generally indicated at 130. Each Bowden wire assembly 130 includes a flexible tube 132 which slidably receives the Bowden wire cable 128 therein. One end of each flexible tube 132 is suitably fixed to the associated leg of the U-shaped frame member 42, as by a clip 134. Each flexible tube 132 containing the associated cable 128 extends beneath the associated leg of the U-shaped member 42 and has its opposite end fixed to a mounting plate 136 secured to the rear surface of the main frame member 40 in depending relation thereto.

Figure 3:
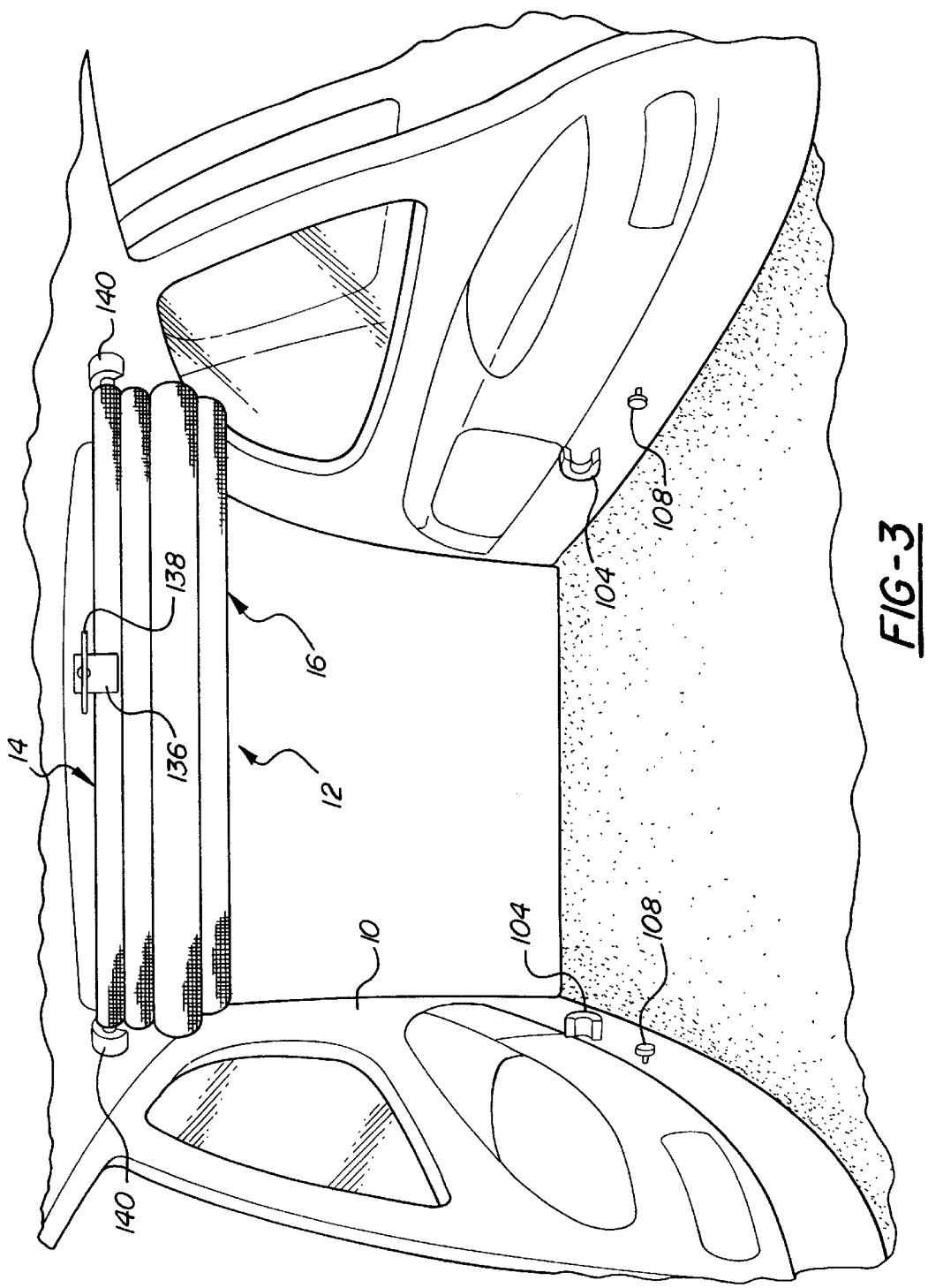
FIG. 3 is a perspective view similar to FIG. 1 showing the seat assembly in its roof storage position.

As shown in FIG. 4, both Bowden wire assemblies are thus connected in side-by-side relation to the mounting plate 136. As best shown in FIG. 3, the cables 128 extending from the flexible tubes 132 are connected to a handle 138. By pulling the handle 138, both cables 128 are moved within the respective flexible tubes 132 to effect a movement of the locking members 122 about their pivot pins 124. The handle 138, the mounting plate 136, and the Bowden wire assemblies 130 comprise an actuating assembly.

The seat assembly 12 is moved from the roof storage position into its operating position by swinging the seat assembly 12 downwardly with the seat cushion assembly 14 folded up against the seat back assembly 16. When the seat assembly 12 is swung downwardly, the nuts 90 will engage within the nut-receiving structures 104 and thus stop the rearward pivotal movement about upper pivot pins extending through the bores 24. Next, the seat cushion assembly 14 is pivoted downwardly about the pivot pins 38 with respect to the seat back assembly 16 from its seat cushion storage position to its seat cushion operative position. During the latter part of this movement, the latching assemblies 106 carried by the seat cushion assembly 14 will be moved into operative relation with the support pins 108 carried by the sides of the van vehicle 10.

FIG. 6 illustrates the position of each latch assembly 106 just prior to the engagement of the associated support pin 108. As the seat cushion assembly 14 is moved further downwardly, each latch member 112 is pivoted in a counterclockwise direction, as viewed in FIG. 6, causing the spring 126 to extend. Each latch member 112 will continue to be pivoted until the associated pivot pin 108 engages the associated mounting plate 109, at which time the locking members 122 are biased by the springs 126 to engage within locking surfaces 120 formed in the forward portion of the latch members 112. The support pins 108 are thus fixedly retained in the latch assemblies 106. In this way, the seat assembly 12 is retained in its operating position.

When it is desired to move the seat assembly 12 from its operating position into its roof-storage position, the handle 138 is again actuated or pulled outwardly which, through the operation of the cables 128, will move the locking members 122 into a position to release the latch members 112. The springs are then operable to bias the latch members 112 downwardly, which has the effect of lifting the seat cushion assembly 14 slightly as the latch assemblies 106 assume the position shown in FIG. 6. The seat cushion assembly 14 can then be further raised manually into the seat cushion storage position alongside the seat back assembly 16 and then the entire seat assembly 12 can then be manually swung upwardly about the pivot pins 26 to the roof storage position.

As best shown in FIGS. 1 and 3, a nut-receiving structure 140 is provided on each side of the vehicle 10 to receive the nuts 90 when the seat assembly 12 has reached its roof-storage position. In addition, there are support pins 142 provided rearwardly of each nut-receiving structure 140 so that, as the entire seat assembly 12 is moved upwardly, the latch assemblies 106 will move from the inoperative position of FIG. 6 into the latched position of FIG. 7. This movement is much the same as previously described so that when the latch assemblies 106 are finally locked, the entire seat assembly 12 will be retained in its roof-storage position. When stored in the storage position alongside the roof, the latch assemblies 106 operate such that the seat cushion assembly and seat back assembly are releasably retained in the storage position so that they can be released therefrom in response to manual operation of the above-described actuating assembly, thereby realizing a releasable storage position.

Preferably, the vehicle seat assembly also includes a yieldable cushion support structure in the form of a pair of gas struts 150 pivotally connected between the transversely spaced side frame members 22 and the interior structure of the motor vehicle, preferably on portions of the side walls located rearwardly of the seat cushion assembly and seat back assembly when in the respective operative positions thereof. The gas struts are constructed and arranged such that they can yieldingly support the seat cushion assembly and seat back assembly 14,16 in the releasably storage positions after the seat cushion assembly and seat back assembly have been released. The gas struts 150 also serve to control the downward movement of the seat cushion assembly and seat back assembly as they are swung downwardly from the storage positions alongside the roof of the vehicle. Preferably, the gas struts 150 operate to provide the effect that the seat cushion assembly and seat back assembly have a neutral weight so that swinging movement thereof requires a minimal amount of effort. Conventional gas struts, such as those used to support vehicle gates or hoods, may be used to perform these functions. It should also be understood that hydraulic struts may be used in order to actively raise the seat cushion assembly and seat back assembly to the storage positions alongside the roof.

The advantage of the present subject matter is that, when the operator of the vehicle 10 desires to use the vehicle as a rear end cargo-type vehicle, the seat assembly 12 can be easily moved from its operative position into a roof-storage position where the cargo space provided is maximal.

It is to be understood that various modifications may be made to the embodiment described hereinabove consistent with the principles of the present invention. For example, the seat cushion assembly 14 may be mounted to the seat back assembly 16 in such a manner that the bottom surface, rather than the seating surface, is coextensive with the back supporting surface of the seat back assembly 16. Also, the seat back assembly 16 may be stored on the roof the motor vehicle with the back supporting surface facing either towards the roof, as described above, or towards the floor of the vehicle. Further, the supporting pins 108, 142 may extend inwardly from the side walls of the vehicle, as described above, or may be fixed to structures attached to the floor and roof, respectively, of the vehicle.

These variations listed in the above paragraph are provided simply to illustrate the various modifications which may be provided within the principles of the present invention. Other various modifications and alterations may be made in accordance with the scope and spirit of the principles of the present invention embodied in the claims appended hereto.

DETAILED DESCRIPTION OF THE SECOND EMBODIMENT OF THE INVENTION

Figure 8:
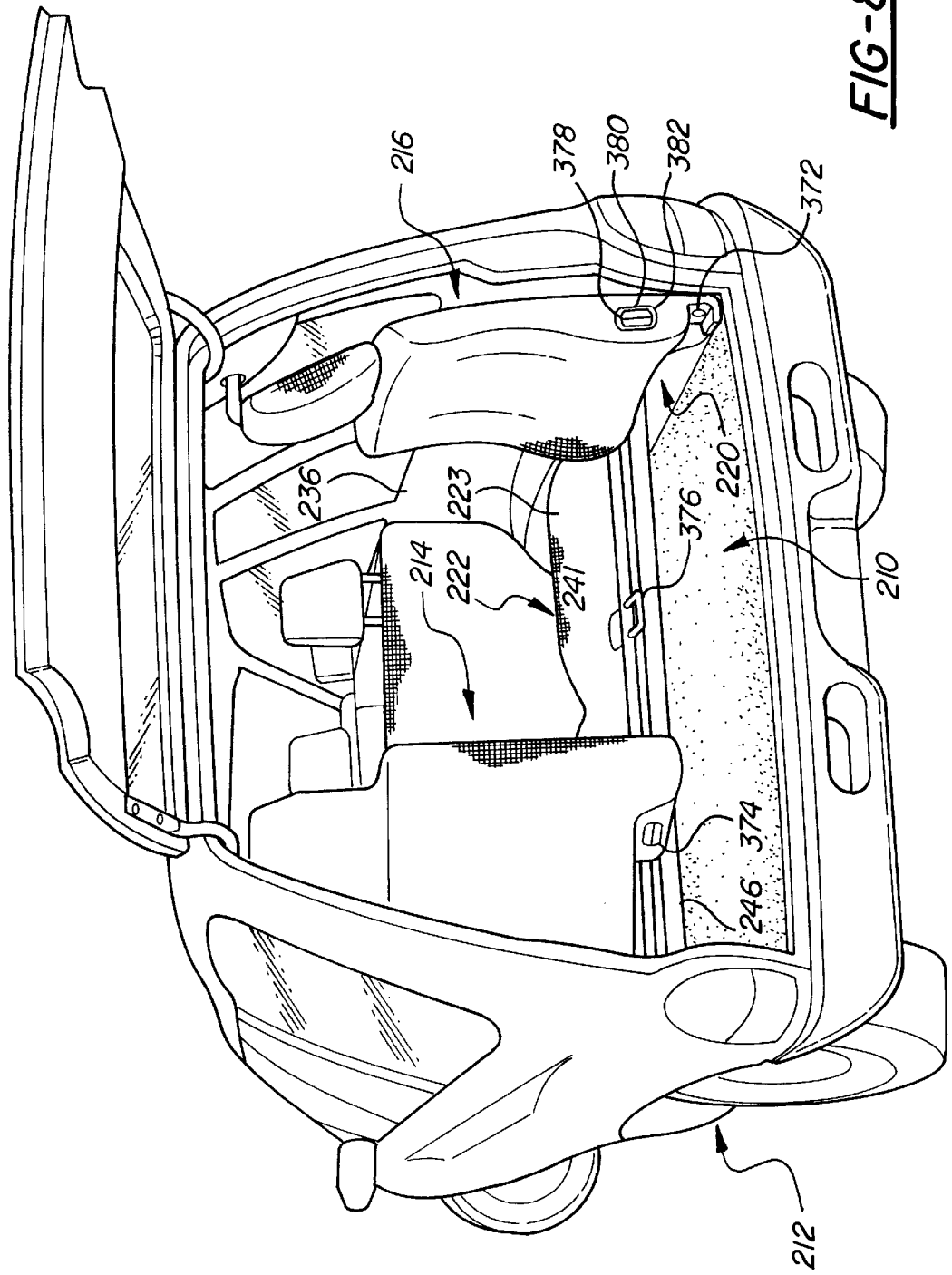
FIG. 8 is a perspective view of the rear of a passenger van with a second embodiment seat assembly according to the principles of the present invention inside.
Figure 9:
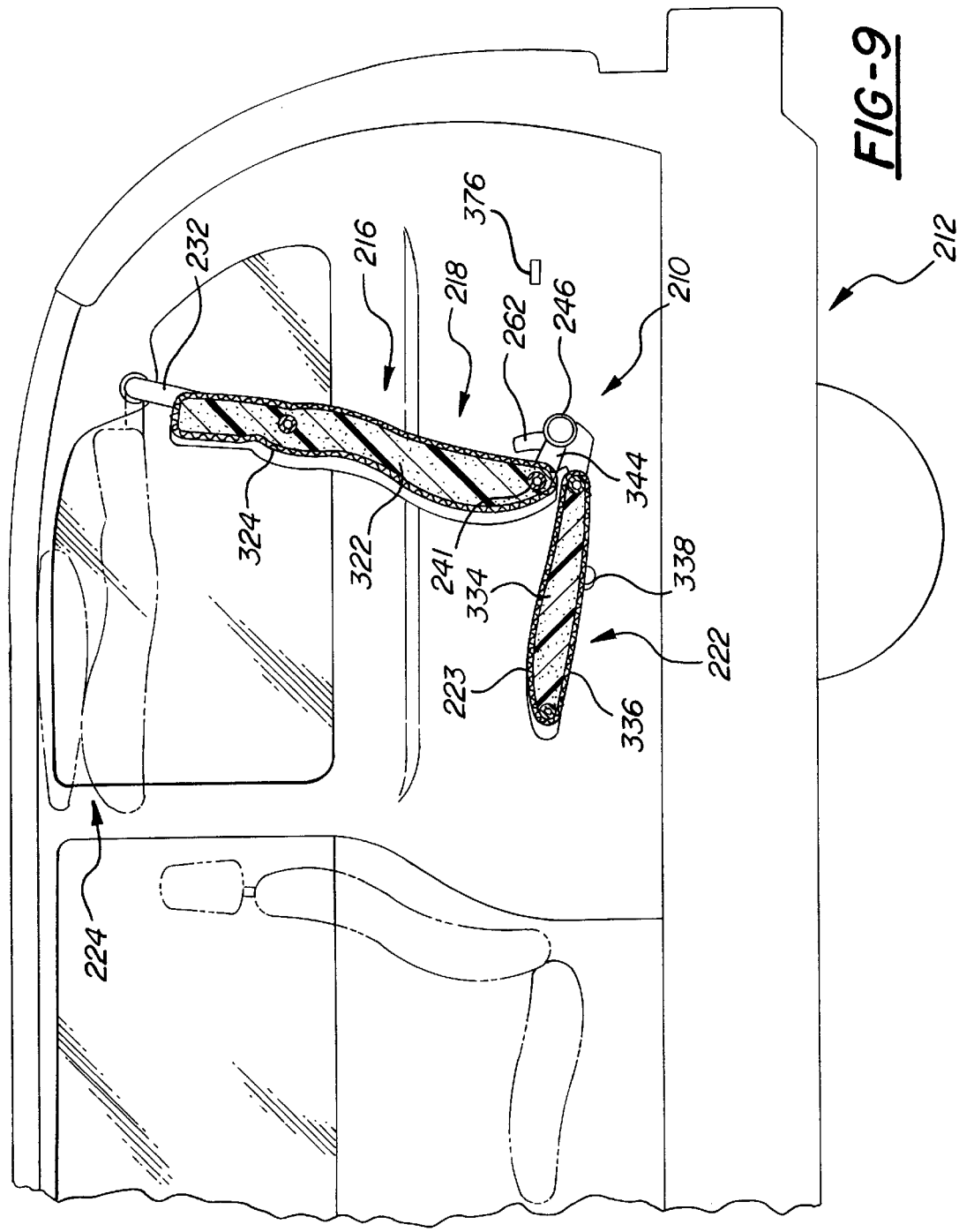
FIG. 9 is a sectional profile view of the van illustrating the seat assembly in an operative position and in a stored position.

Referring to the drawings, FIG. 8 illustrates a seat assembly, generally indicated at 210, embodying the principles of the present invention inside a passenger van, generally indicated at 212. The seat assembly 210 includes a left seat assembly 214 and a right seat back assembly 216 which are constructed and arranged to swing open from an operating position, generally indicated at 218, to a deployed position, generally indicated at 220. These right and left seat back assemblies 214, 216 may also be referred to as seat back sections. As shown in FIG. 9, the seat assembly 210 is also constructed and arranged such that a seat cushion assembly 222 pivots to an intermediate position alongside the seat back assemblies 214, 216 and the entire seat assembly 210 swings up to a roof storage position, generally indicated at 224. A seat back operative position is realized when both of the seat back assemblies are in the seat back operating positions thereof.

In view of the ceiling storing position 224 of the seat assembly 210, it is highly desirable that the weight of the seat assembly 210 be reduced as much as possible commensurate with good safety and comfort practices. Also, it is contemplated that seat belt assemblies for the occupants will be carried on the seat assembly 210.

Figure 11:
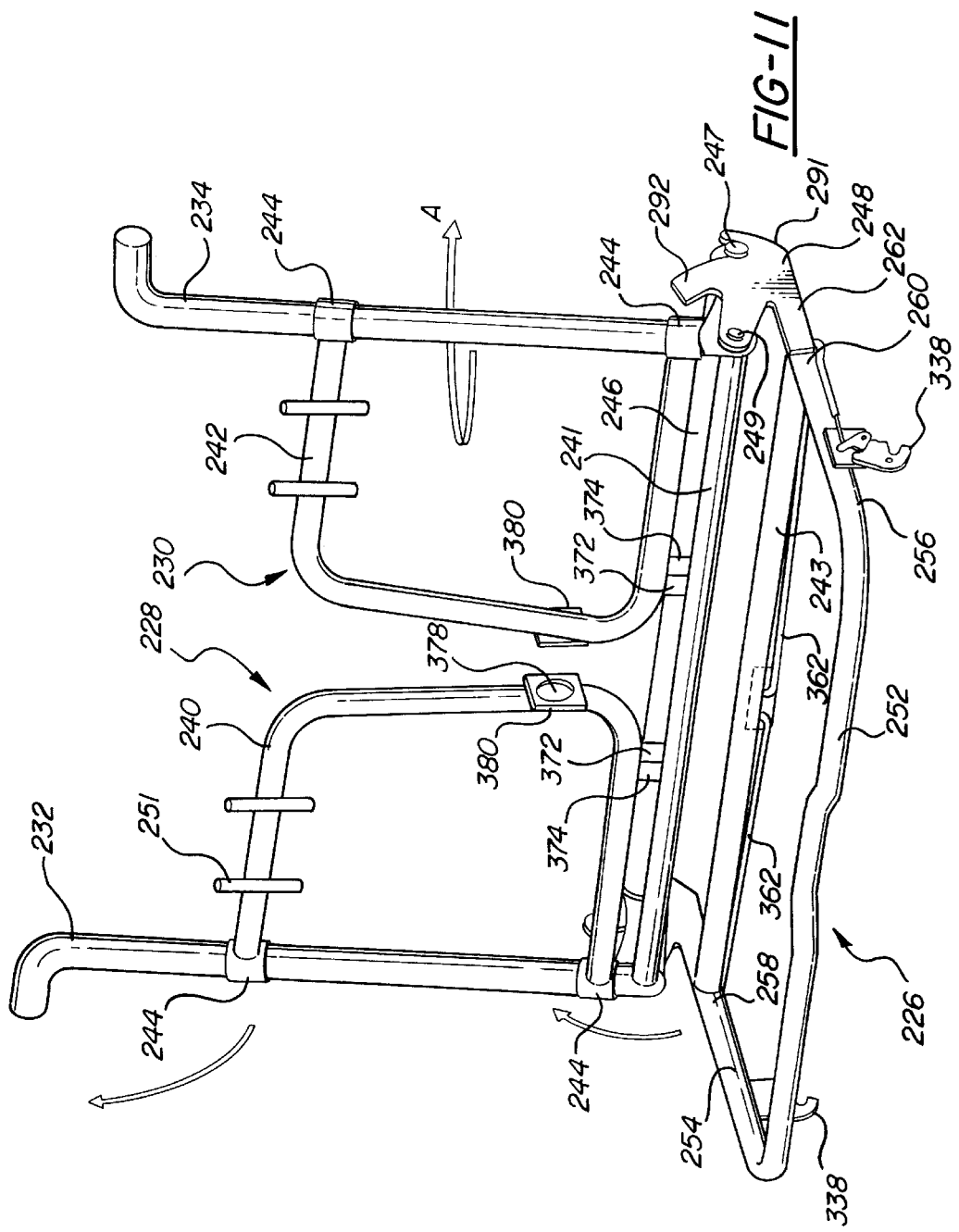
FIG. 11 is a perspective view of a seat frame assembly of the seat assembly.
Figure 12:
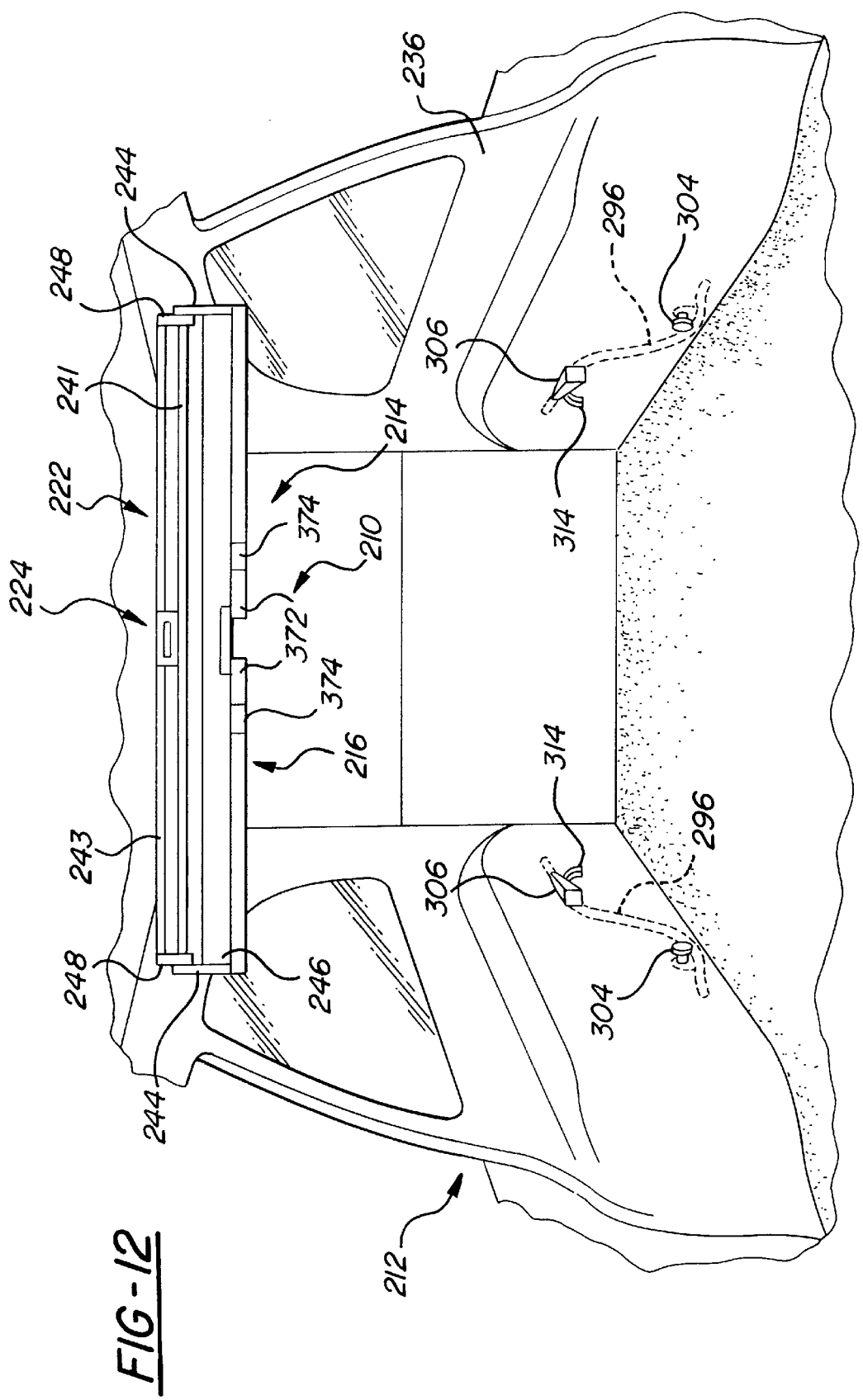
FIG. 12 is a fragmentary perspective view of the inside of the passenger van with the seat assembly in a ceiling storing position.

All of these factors make weight reduction difficult to achieve. To this end, the seat assembly 210 includes, referring more particularly to FIG. 11, a lower seat frame assembly 226, a right seat back frame assembly 228, and a left seat back frame assembly 230. The right and left seat back frame assemblies 228, 230 pivot from the operative position 218 to the deployed position 220 with respect to the seat assembly 210. As best shown in FIG. 11, the right and left seat back frame assemblies 228, 230 include a pair of side frame members 232, 234 which are of tubular construction. Upper ends of the side frame members 232, 234 are bent at approximately a right angle so that each end of the tubular side frame members 232, 234 face outwardly. The upper ends of the side frame members 232, 234 are configured to be rotated on pivot pins (not shown) located on the interior walls 236 of the van 212 near the ceiling as shown in FIG. 9. These pivot pins allow the seat assembly 210 to be swung from the operative position 218 to the ceiling storing position 224. It is to be understood that the gas struts 150 of the first embodiment may be used to control the movement of the cushion assembly in this second embodiment.

Each seat back frame assembly 228, 230 further includes a generally U-shaped swinging frame member 240, 242. Cylindrical pivot members 244 are disposed on the end of each leg of the swinging frame members 240, 242. These cylindrical pivot members 244 allow the swinging frame members 240, 242 to pivot about the side frame members 232, 234 in a direction like that indicated by arrow A in FIG. 11, thereby pivoting the seat back assemblies 214, 216 from the operative position 218 to the deployed positions 220. When the seat back assemblies 214, 216 are in the deployed positions thereof, elongated articles of cargo can be disposed in the vehicle by laying them across the seating surface of the seat cushion assembly 222 and between the seat back assemblies 214, 216 in a longitudinal direction of the vehicle. Additionally, passage of persons and articles between portions of the vehicle located forwardly and rearwardly of the vehicle seat assembly 210 is allowed when the seat back assemblies are in the deployed positions 220 thereof.

The upper leg of each U-shaped swinging frame member 240, 242 has tubes 251 for adjustably receiving a pair of head restraint assemblies 245. It is also contemplated that the head restraint assemblies 245 may be fixed directly to the swinging frame members 240, 242.

A lower seat back frame member 241 having a tubular construction extends between the lower ends of each side frame member 232, 234. The lower end of each side frame member 232, 234 is fixedly attached to a mounting bracket 239 by bolts, welding, or other similar securing means. Each mounting bracket 239 extends downwards and backwards from the side frame members 232, 234. A tensile structure in the form of a main horizontal frame member 246 extends between the two mounting brackets 239. The mounting brackets 239 are secured to the main horizontal frame member 246 by tensile force transmitting pins in the form of latch pins 247 disposed on the ends of the main horizontal frame member 246. The lower end of each side frame member 232, 234 is also connected to a pivoting bracket 248. The pivoting brackets 248 and the lower end of each side frame member 232, 234 are apertured to receive pivot pins 249. The pivoting brackets 248 are connected to the side frame members 232, 234 with the pivot pins 249 such that each pivoting bracket 248 pivots about the lower end of the side frame members 232, 234.

The seat cushion assembly 226 includes a generally U-shaped seat frame member 252 having a tubular construction. The U-shaped seat frame member 252 has a pair of legs 254, 256 and an end portion 258, 260 of each leg is flattened. A generally horizontal rear frame member 243 extends between the end portions 258, 260 of each leg 254, 256. The end portion 258, 260 of each leg 254, 256 is also fixedly engaged to a mounting arm 262 of each pivoting bracket 248 by welding. Bolts or other similar securing means may also be used to fixedly engage the end portions 258, 260 and the mounting arms 262. Thus, the seat cushion frame assembly 226 is pivotally connected to the seat back frame assemblies 228, 230 by the use of the pivoting brackets 248. Preferably, the seat back assemblies 214, 216 and the seating areas 223 of the seat cushion assembly are angled inwardly to provide more leg room behind the seat or seats in front of the seat assembly 210.

Figure 10:
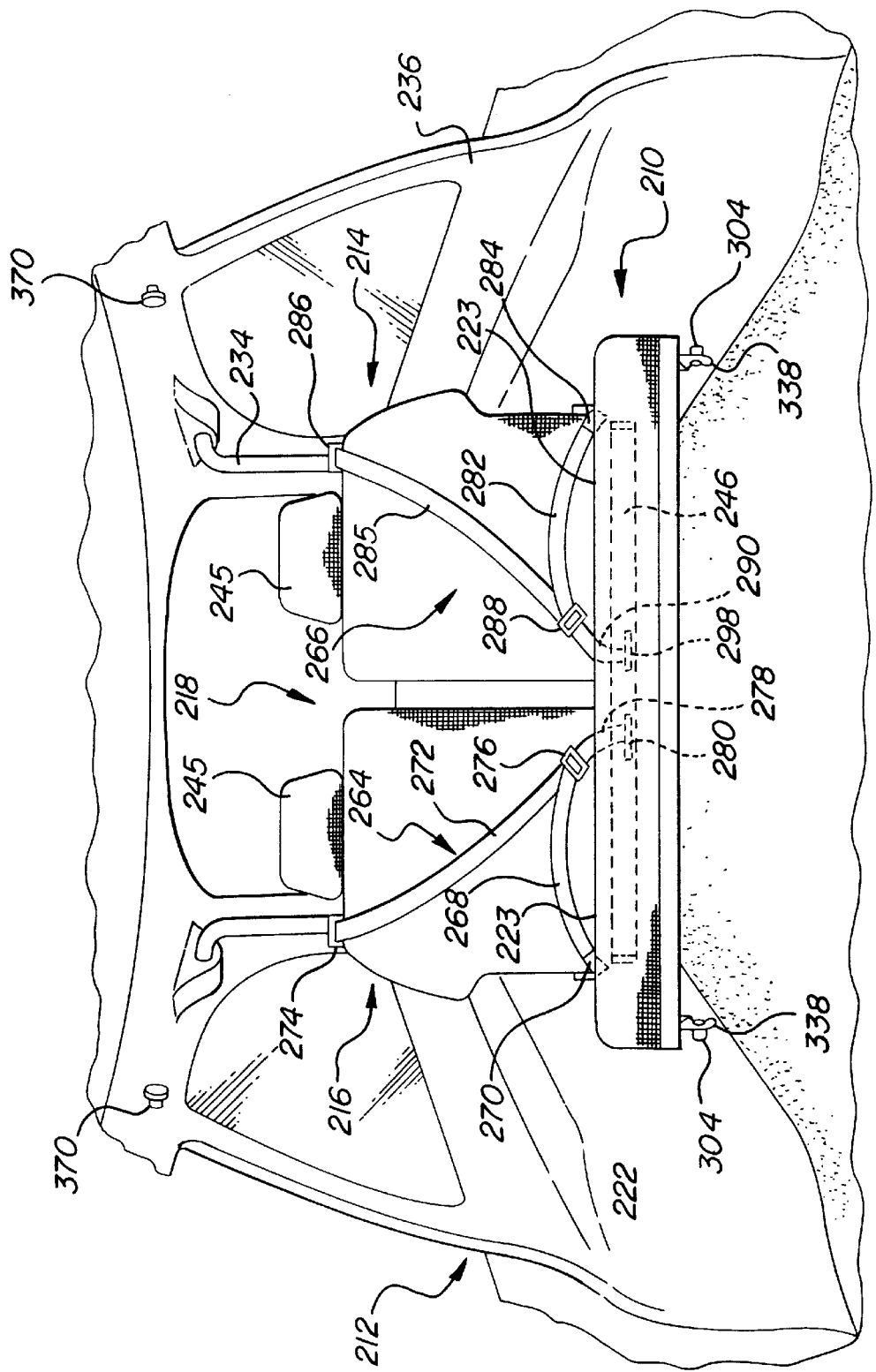
FIG. 10 is a fragmentary perspective view of the inside of the van depicting the seat assembly in the operative position.

As is best shown in FIG. 10, the seat assembly 210 includes two separate seat belt assemblies, generally indicated at 264 and 266. The right seat belt assembly 264 includes a lap belt 268 which is suitably fixed at one end to a connecting member 270. The connecting member 270 is connected to the latch pin 247 on the right side of the main horizontal frame member 246 inside of the mounting bracket 244. The opposite end of the lap belt 268 is connected with one end of a shoulder belt 272 which extends from a reel assembly 274. The reel assembly 274 is carried by the right seat back frame assembly 214 at a position adjacent the juncture of the right swinging frame member 240 and the right side frame member 232. The interconnected lap and shoulder belts 268, 272 are provided with a latch element (not shown) which enters a releasable latch receiving assembly 276 fixed to the end of a short belt which is fixed to a connecting member 278. The connecting member 278 is fixed to a belt bracket 280. The belt bracket 280 is secured to the main horizontal frame member 246 by welding or other similar securing means at a position spaced from the right end of the frame member 246 as best shown in FIG. 10.

The left seat belt assembly 266 includes a lap belt 282 fixed at one end to a connecting member 284. The connecting member 284 is secured to the latch pin 247 on the left side of the main horizontal frame member 246 inside of the mounting bracket 244. The opposite end of the lap belt 282 is connected to one end of a shoulder belt 285 which extends from a reel assembly 286. The reel assembly 286 is fixed to the left seat back frame assembly 216 adjacent the juncture between the left side frame member 234 and the left swinging frame member 242. As before, the interconnected shoulder and lap belts 282 and 284 are provided with a latch element (not shown) which enters a releasable latch receiving assembly 288. The latch receiving assembly 288 has a short belt which is suitably fixed to the connecting member 290. The connecting member 290 is fixed to a belt bracket 292. The belt bracket 292 is secured to the main horizontal frame member 246 by welding or other similar securing means at a position spaced from the left end of the frame member 246 as best shown in FIG. 10. Also, it is contemplated that the reel assemblies 274, 286 of the right and left seat belt assemblies may be secured to the interior walls 236 of the van 212 rather than adjacent the junctures of the side frame members 232, 234 and the swinging frame members 240, 242.

Figure 13:
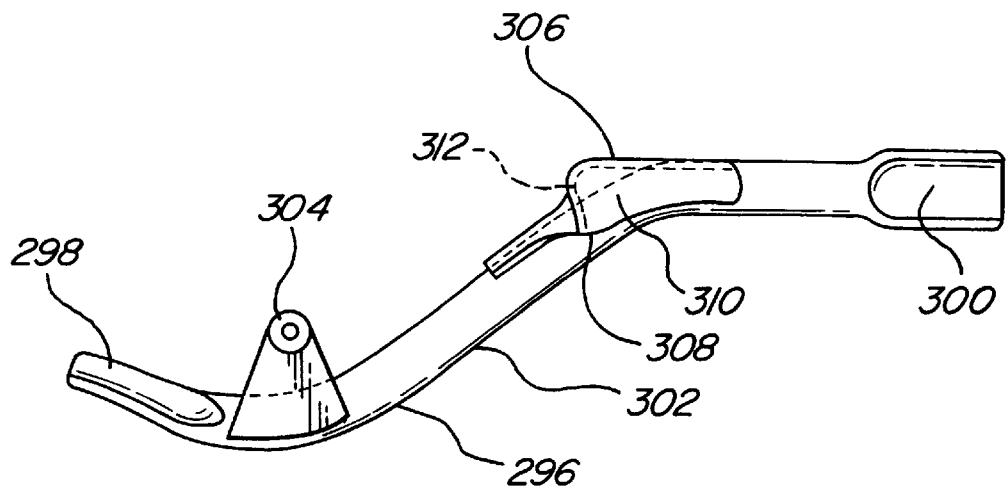
FIG. 13 is a side plan view of a tubular load carrying bracket.
Figure 14:
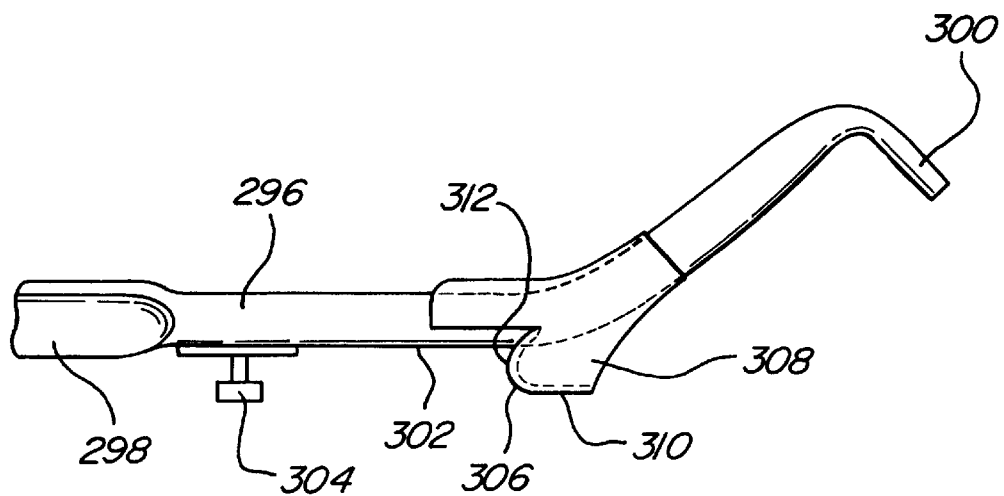
FIG. 14 is a top plan view of the load carrying bracket shown in FIG. 13.
Figure 15:
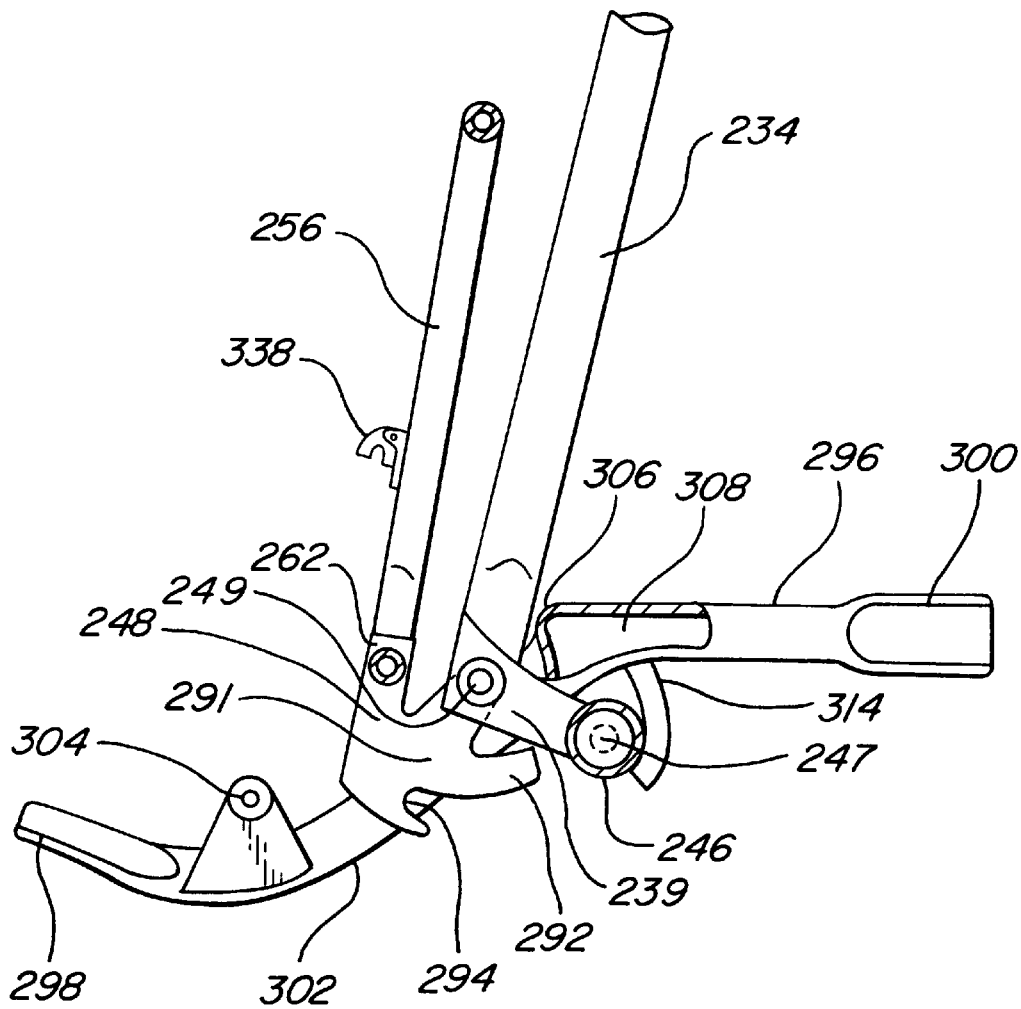
FIG. 15 is a side view of the seat frame assembly shown in FIG. 11 with a lower seat frame assembly shown in FIG. 11 folded up to a seat back frame assembly.
Figure 16:
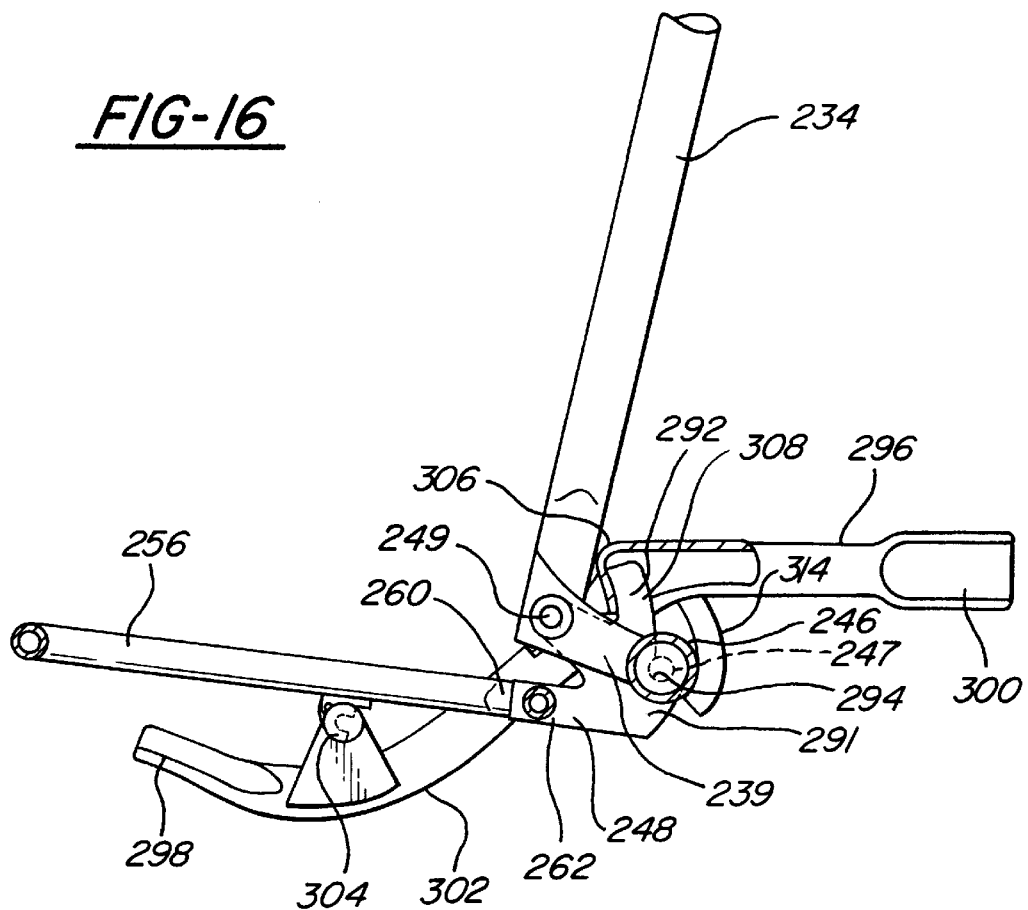
FIG. 16 is a side view of the seat frame assembly shown in FIG. 11 in the operative position.

As best shown in FIGS. 15 and 16, the pivoting brackets 248 each have a squab latch portion 291 with an engaging arm 292 extending from the bracket 248 and a C-shaped nut-engaging slot 294 immediately below the engaging arm 92. FIGS. 13 and 14 illustrate a tubular load carrying bracket 296. A load carrying bracket 296 is fixed in the interior of the van body on each side of the van 212 as best shown in FIG. 13. Each load carrying bracket 296 has a tubular construction with flattened opposite ends 298, 300, one of which is a wheel house end 298 and the other of which is a D-pillar attachment and 300. The wheelhouse end 298 of each load carrying bracket 296 is curved upwardly to attach to a wheelhouse (not shown) of the van 212. A D-pillar attachment end 300 of each load carrying bracket 296 extends outwardly at an approximately 45 degree angle and has an inwardly facing right angle for attaching the load carrying bracket 296 to a D-pillar (not shown) in the body of the van 212. A center portion 302 of the load carrying bracket 296 extends upwardly at approximately a 45 degree angle from the wheelhouse end 298 to the D-pillar attachment end. A seat cushion latch striker 304 adjacent the wheelhouse end portion 298 extends inwardly from each center 302 through the van walls and extends into the interior of the van 212.

A squab latch engaging area 306 is attached to each load carrying bracket at the juncture of the center portion 302 and the D-pillar attachment end 300. Each squab latch engaging area 306 has a downwardly facing squab latch receiving opening 308. The squab latch receiving openings 308 extend through each van wall 236 and into the interior of the van 212. Each squab latch receiving opening 308 is defined by a first vertical wall 310 that is parallel to and spaced evenly from the van walls 236 and a second vertical wall 312 that extends inwardly from the load carrying bracket 296 through each van wall 236 and is formed continuously with the first vertical wall 310.

As best shown in FIGS. 15 and 16, when the seat assembly 210 is swung down from the roof storage position 224 and disposed in the operative position 218, the heads of the latch pins 247 of the main horizontal frame member 246 engage latch pin supports 314 projecting inwardly from each van wall 236. As the lower seat frame assembly 226 is swung down from the seat cushion storage position shown in FIG. 15 to the operative position 218 shown in FIG. 16, each pivoting bracket 248 pivots about the side frame members 232, 234 of the seat back frame assemblies 214, 216 and each engaging arm 292 of the squab latch portions 291 of the pivoting brackets 248 engages the squab latch receiving openings 308 extending inwardly from the load carrying brackets 296. Also, the C-shaped engaging slot 294 of each squab latch portion 291 engages the shaft of each latch pin 247. Thus, the squab latch portions 291 of the pivoting brackets 248 retain the latch pins 247 of the main horizontal frame member 246 in an engaged relation with the squab latch engaging areas 306 of each tubular load carrying bracket 296.

It is to be understood that the squab latch portions and the tubular load carrying members may also be utilized in the seat assembly described in the first embodiment. Likewise, it is contemplated that the nut-receiving structures described in the first embodiment of the present invention may be used in this second embodiment in place of the squab latch an tubular load carrying bracket.

In the event of an accident such as a head-on collision, the forward thrust of the seat occupants is resisted by the seat belt assemblies 264, 266. The force imposed on the seat belt assemblies 264, 266 by the forward thrust of the occupants is transmitted to the connecting members 270, 278, 284, 290. The forces transmitted to the connecting members 278 and 290 will cause the main horizontal frame member 246 to bend in a forward direction. The main frame member 240 functions as a tensile structure according to the principles of the present invention as described above with respect to the first embodiment.

As best shown in FIG. 9, the seat back assemblies 214, 216 include in conjunction with the seat back frame assemblies 228, 230 a pair of thin foam cushions 322 covered with suitable covers 324. Preferably the covers 324 are designed to entirely cover the seat back assemblies 214, 216 such that the seat back frame assemblies 228, 230 are hidden from view. To enable the foam cushions 322 and covers 324 to be minimized in bulk and weight, a pair of spring-like elongated stabilizing elements (not shown) may be mounted vertically between the upper and lower legs of the U-shaped swinging frame members 240, 242. A suspension membrane (not shown) may also be mounted between the left and right legs 254, 256 of the U-shaped frame member 252 to receive thereon foam cushion 334 suitably covered by a cover 336. As before, a pair of stabilizing elements (not shown) may be provided between the legs 254, 256 of the U-shaped frame member 252 to aid in supporting the cushion 334, if desired. Preferably, the contours of the seating surface of the seat cushion assembly complements the contours of the back supporting surfaces of the seat back portions so that the cushion assemblies have a reduced vertical profile when in the storage position thereof.

Referring now more particularly to FIG. 11, the seat cushion assembly 226 of the seat assembly 210 is selectively retained in its operating position by means of a pair of latch assemblies, generally indicated at 338, fixed to each leg 254, 256 of the U-shaped frame member 252. The latch assemblies 338 have a construction similar to the latch assemblies described in the first embodiment.

As shown in FIG. 11, Bowden wire assemblies 362 are connected in side-by-side relation to the mounting plate 368. These Bowden wire assemblies actuate the latch assemblies in the manner described above with respect to the first embodiment.

The seat assembly 210 is moved into its operative position 218 by swinging the seat assembly 210 down from the ceiling storing position 224 with the seat cushion assembly 222 folded upwardly against the seat back assembly 214, 216. When the seat assembly 210 is swung downwardly, the latch pins 247 will engage the latch pin supports 314 and thus stop the rearward pivotal movement about the pivot pins 238 located on the ceiling. Next, the seat cushion assembly 222 and pivoting bracket 248 are pivoted downwardly about the pivot pins 249 with respect to the seat back assemblies 214, 216. During the latter part of this movement, the latching assemblies 338 carried by the seat cushion assembly 222 will be moved into operative relation with the seat cushion latch strikers 304 carried by the walls 336 of the van vehicle 212.

As best shown in FIG. 10, seat cushion latch strikers 370 are provided on the ceiling of the van 212 so that, as the entire seat assembly 210 is moved upwardly, the latch assemblies 338 will move from the inoperative position thereof into the latched position thereof. This movement is much the same as previously described so that when the latch assemblies 338 are finally locked, the entire seat assembly 210 will be retained in its ceiling storage position 224.

Operating position retaining structure and deployed position retaining structure in the form of forwardly facing and rearwardly facing deployment latch assemblies 372, 374, respectively, are fixed to the bottom of each seat back assembly 214, 216 adjacent the center of the seat assembly 210. The deployment latch assemblies 372, 374 are attached to the lower legs of the U-shaped swinging frame members 240, 242 by welding, bolts, or other suitable attachment means. The forwardly facing latch assemblies 372 are attached to the U-shaped swinging frame member inwardly from the rearwardly facing latch assemblies 374 and each have an opening facing forward when the seat back assemblies 214, 216 are in the operative position 218. The rearwardly facing latch assemblies 374 each have an opening facing the rear of the van 212 when the seat back assemblies 214, 216 are in the operating positions 218 thereof.

The forwardly facing and rearwardly facing latch assemblies 372, 374 have a construction similar to conventional door latches. Examples of such door latches are given in U.S. Pat. Nos. 3,523,704, 3,697,105, 5,000,495, and 4,929,007 all of which are hereby incorporated into the present application by references. It is also contemplated that a construction such as that of the hood latch disclosed in U.S. Pat. No. 4,936,611 could be used, which is hereby incorporated into the present application by reference.

Seat back latch strikers 376 are fixed to the seat assembly 210 and the interior walls 236 of the van 212. The two seat back latch strikers 376 on the seat assembly 210 each have two legs attached to the lower seat back frame member 241, spaced axially with respect to the member 241 and extending radially in a vertical direction therefrom. A striking piece connects the legs of each seat back latch striker 376 on the seat assembly 210. Likewise, the two seat back latch strikers 376 on the van walls 236 are fixed to the wall by welding or similar attachment means and each have two legs spaced horizontally and extending orthogonally and inwardly with respect to the van wall 236 in a horizontal direction. As before, the ends of the legs of each seat back latch striker 376 on the van walls 236 are connected by a striking piece. The strikers 376 are disposed such that when the seat back cushion assemblies 214, 216 are in the operative position 218, the strikers 376 on the seat cushion assembly 210 engage the forwardly facing latch assemblies 372 in a locking relation, thereby securing the seat back cushion assemblies 228, 230 in the operative position 218, and when the seat back assemblies 214, 216 are in the deployed position 220, the strikers 376 on the van walls 236 engage the rearwardly facing latch assemblies 374, thereby securing the seat back cushion assemblies 228, 230 in the deployed position 220.

An actuating handle 378 is disposed on the inside side of each seat back assembly 214, 216. The actuating handles 378 are pivotally mounted in the brackets 380 which are fixedly attached to the inside members of the U-shaped swinging frame members 240, 242 adjacent the latch assemblies 372, 374. The actuating handles 378 are accessible through apertures 382 in the covers 324 covering the seat back assemblies 214, 216. Each actuating handle 378 is operatively connected to a corresponding forwardly facing latch assembly 372 and a corresponding rearwardly facing latch assembly 374 by Bowden wires (not shown) or other conventional means capable of transmitting movement such that manually operating the actuating handles 378 actuates the forwardly facing latch assemblies 372 and the rearwardly facing latch assemblies 374 and disengages the latch assemblies 372 from the strikers 376.

It is also contemplated that the seat back assemblies 214, 216 may be spaced immediately adjacent to each other in the operative position 218. Therefore, it is contemplated that the actuating handles 378 would be located at a position accessible from both the operative position 218 and the deployed position 220, such as on the top or bottom of each seat back assembly 214, 216. Also, two handles on each seat back assembly 214, 216 may be used to promote such accessibility.

Thus, to move the seat back assemblies 214, 216 from the operative position 218 to the deployed position 220, the actuating handles 378 are manually operated, thereby disengaging the forwardly facing latch assemblies 372 from the strikers 376 on the seat assembly 210, and the seat back assemblies 214, 216 are pivoted backward about the side frame members 232, 234. As the seat back assemblies 214, 216 reach the deployed position 220, the rearwardly facing latch assemblies 374 engage the strikers 376 on the van walls 236 in a locking relation, thereby securing the seat back assemblies 214, 216 in the deployed position 220. Likewise, to move the seat back assemblies 214, 216 from the deployed position 220 to the operative position 218, the actuating handles 378 are manually operated, thereby disengaging the rearwardly facing latch assemblies 374 from the strikers 376 on the van walls 236, and the seat back assemblies 214, 216 are pivoted forward about the side frame members 232, 234. As the seat back assemblies 214, 216 reach the operative position 218, the forwardly facing latch assemblies 372 engage the strikers 376 on the seat assembly 210 in a locking relation, thereby securing the seat back assemblies 214, 216 in the operating position 218.

Figure 17:
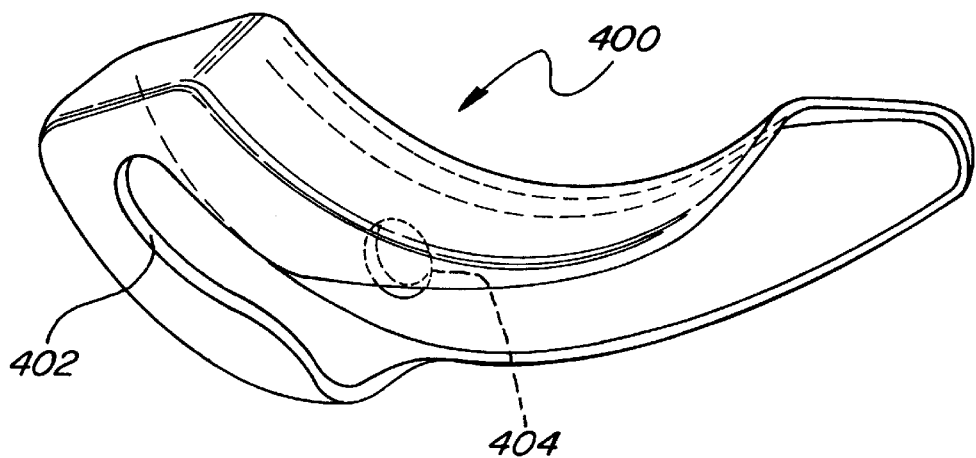
FIG. 17 is a perspective view of an alternative construction of a pin receiving structure disposed on the side wall of the motor vehicle.

FIG. 17 illustrates an alternative pin receiving structure, generally indicated at 410, which can be mounted to the side walls of the motor vehicle so as to receive the tensile force transmitting pins of any vehicle seat assembly embodying the broad principles of the present invention when the seat assembly is mounted within the interior space of the vehicle. Preferably, this alternative pin receiving structure 400 is to be used in conjunction with vehicle seat assemblies in which at least the seat back assembly thereof can be swung upwardly to a storage position alongside the roof of the vehicle.

The alternative pin receiving structure 400 is constructed and arranged to be mounted on the side walls of the vehicle by welding or other suitable means at any suitable location capable of carrying the loads applied thereto. An arcuate pin receiving slot 402 is formed therein to receive the tensile load transmitting pins of the seat cushion assembly when the cushion assemblies thereof are in the operative positions thereof. It is to be understood that the curvature of the pin receiving slot 402 need not be the same as the travel of the tensile load transmitting pins. By varying the curvature of the slot 402, the seat back assembly can be urged downwardly so as to create tension in the seat back frame structure and the transversely spaced side members to thereby obtain a more rigid mounting.

Figure 19A:
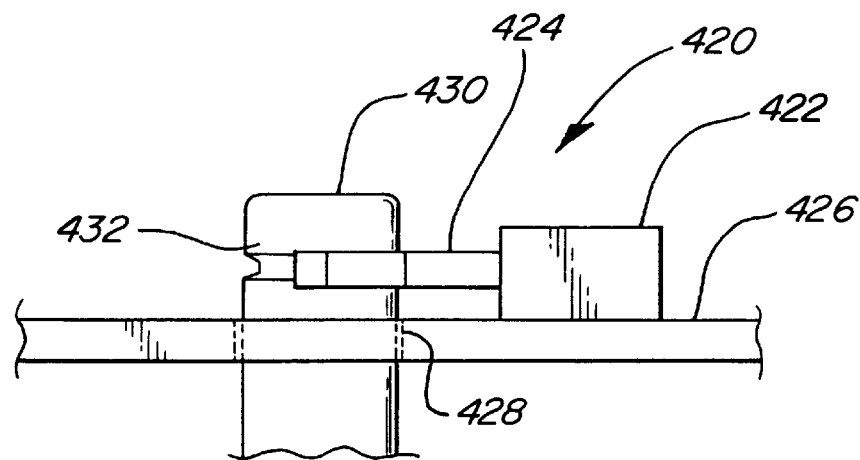
FIGS. 19A and 19B are fragmentary views of the upper portion of the interior of the vehicle having a vehicle condition actuated locking structure mounted thereon.
Figure 19B:
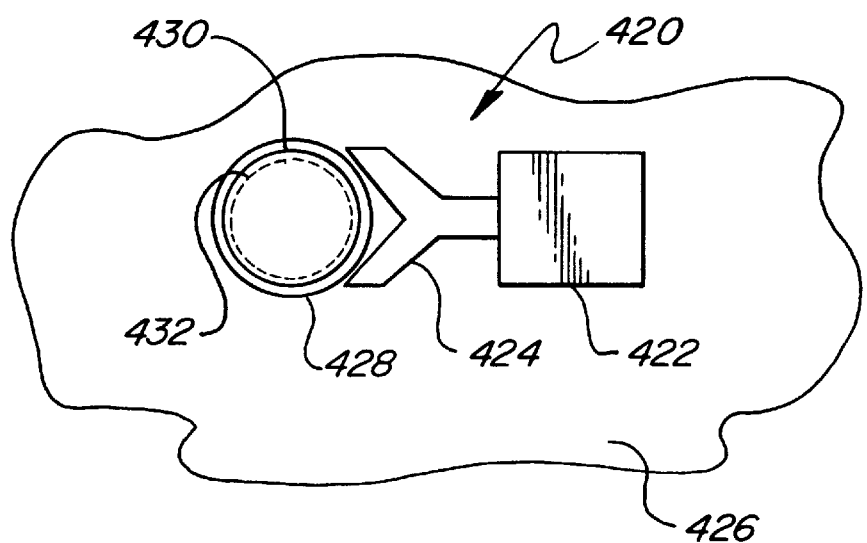

The pin receiving structure optionally may have a pin hole 404 which is designed to receive a spring biased pin, shown in FIGS. 19A and 19B and indicated at 430, mounted on the cushion associated frame structure to provide further resistance against fore and aft movement of cushion assemblies. In order to move the cushion assemblies from the operative positions thereof, the spring biased pins are moved out of engagement with the pin holes 404. It is contemplated that these spring biased pins may be operated either by the actuating assembly having Bowden wire assemblies described above with respect to either of the two embodiments or by use of a solenoid which actuates the pins responsive to certain operating conditions of the vehicle.

FIG. 18 illustrates an alternative construction for pivotally connecting the seat cushion frame structure 406 to the seat back frame structure 408. The seat cushion frame structure 406 has a tensile structure in the form of a main frame member 400 extending transversely across a rear portion thereof. The tensile structure performs the same function as those described above and has a similar construction.

However, the tensile load transmitting pins in the form of nuts 412 are mounted off center with respect to the main frame member 410 so that the nuts are below the central, longitudinal axis of the frame member 410 when the cushion assemblies are in the operative positions thereof. The tensile element is still mounted within the frame member 410 along the central longitudinal axis thereof on tensile element mounting structures like those tensile elements described above. To ensure transmission of the tensile forces built-up in the tensile element, the tensile element is operatively communicated with the tensile force transmitting pins by virtue of the bracket 414 which pivotally connects the seat cushion frame structure 406 to the seat back frame structure 408, thereby connecting the tensile force transmitting pins in force transmitting relation with the tensile element mounting structures.

A pin slot 416 is formed in the lower portion of the bracket 414 associated with the seat back frame structure 408. This pin slot 416 limits the movement of the seat cushion assembly beyond the operative position thereof by engaging the nuts 412.

It is to be understood that the latch assemblies mounted on the seat cushion frame structures in the previously discussed embodiments may be replaced by strikers 418 as shown in FIG. 18. These strikers 418 may be engaged by latches (not shown) mounted on the side walls of the motor vehicle or may simply rest on engaging portions (not shown) on the side walls of the vehicle. Removing the latch assemblies from the frame structure is advantageous in that it reduces the weight of the seat assembly.

Additionally, a vehicle operating condition locking structure, illustrated in FIG. 19A and 19B and generally indicated at 420, may be used to retain the cushion assemblies in the storage positions thereof alongside the roof. The locking structure 420 is in the form of a solenoid 422 operatively communicated to the ignition of the vehicle and a Y-shaped engaging element 424. The locking structures 420 are disposed rearwardly and below the nut-receiving structure 140, illustrated in the first embodiment described above, and on the side wall surface 426 facing away from the interior of the vehicle so that they are adjacent a pin receiving hole 428 adapted to receive the aforementioned spring-biased pins 430. The pin receiving holes 428 are configured to support the cushion assemblies in the storage positions thereof alongside the roof when the spring-biased pins are inserted therein.

The solenoid 422 senses a vehicle operating condition by being communicated to the ignition of the vehicle so that when it senses that the engine is running, the Y-shaped engaging element will be moved outwardly therefrom to engage the retractable pins 430, thereby preventing the retractable pins mounted on the cushion associated frame structure from being withdrawn from the pin receiving holes 428, thereby preventing the cushion assemblies from swinging downwardly during vehicle operation. Also, an annular groove 432 is preferably formed on each of the pins 430 to facilitate engagement of the Y-shaped engaging element 424 therewith. It is also contemplated that the solenoid may be communicated with the transmission rather than the ignition so that the Y-engaging element 424 is moved outwardly from the solenoid when the transmission is shifted from a neutral gear to a forward or reverse gear. It is to be understood that the construction and operation of the locking structure 420 may be use in conjunction with any vehicle seat assembly in which at least a cushion assembly thereof is movable to a storage position alongside the roof of the vehicle.

Any United States patent applications or patents cited hereinabove are hereby incorporated by reference into the present specification.

It will be thus seen that the objects of the present invention have been fully and effectively accomplished. It will be realized, however, that the foregoing preferred specific embodiments have been shown and described for the purposes of illustrating the functional and structural principles of the present invention and is subject to change without departure from such principles. Therefore the present invention includes all modifications encompassed within the spirit and scope of the following claims.

What is claimed is:

1. A folding seat assembly for a vehicle comprising;
    a back frame,
    a cushion frame pivotally supported for pivotal movement about a first axis between a seating position and a storage position,
    said assembly characterized by a pair of transversely spaced and vertical frame members extending upwardly from said back frame to a pair of pivot joints for pivotal connection to the vehicle on a second axis whereby said pivot joints may be connected adjacent the roof of a vehicle for folding said cushion frame about said first axis to said storage position and pivoting said back frame upwardly about said second axis to position said back frame alongside the roof of the vehicle.

2. An assembly as set forth in claim 1 wherein said back frame includes at least one top cross member defining the top of said back frame and said vertical frame members extend upwardly above said top cross member.

3. An assembly as set forth in claim 2 including headrest mounts disposed on said top cross member for supporting head rests above said top cross member and below said pivot joints.

4. An assembly as set forth in claim 2 including a back latch adjacent said first axis for securing said assembly to the vehicle for limiting movement of said vertical frame members about said second axis.

5. An assembly as set forth in claim 4 including a cushion latch for securing said cushion frame to the vehicle for limiting movement of said cushion frame about said first axis.

6. An assembly as set forth in claim 1 wherein said cushion frame is pivotally connected to said back frame for pivotal movement to said storage position overlying said back frame for movement with said back frame to said position alongside said roof.

7. A vehicle assembly comprising;
    a floor and an upper portion there above defining a compartment with a roof,
    a back frame,
    a cushion frame pivotally supported in said vehicle for pivotal movement about a first axis between a seating position overlying said floor and a storage position,
    said assembly characterized by a pair of vertical frame members extending upwardly from said back frame to a pair of pivot joints connected to said vehicle adjacent to said roof for pivotal movement about a second axis for folding said cushion frame about said first axis to said storage position and pivoting said back frame upwardly about said second axis to position said back frame alongside said roof of said compartment.

8. An assembly as set forth in claim 7 wherein said back frame includes at least one top cross member having ends and defining the top of said back frame, and said vertical frame members extending upwardly above said top cross member.

9. An assembly as set forth in claim 8 including headrest mounts disposed on said top cross member for supporting head rests above said top cross member and below said second axis defined by said pivot joints.

10. An assembly as set forth in claim 8 including a first anchor on the vehicle and a back latch adjacent to said first axis for securing assembly to said first anchor on said vehicle for limiting movement of said swing member about said second axis.

11. An assembly as set forth in claim 10 including a second anchor on said vehicle, a cushion latch for securing said cushion frame to said anchor on said vehicle for limiting movement of said cushion frame about said first axis.

12. An assembly as set forth in claim 7, wherein said cushion frame is pivotally connected to said back frame for pivotal movement to said storage position overlying said back frame for movement with said back frame to said position along side said roof.

13. A vehicle seat assembly in combination with a motor vehicle having an interior space defined by a bottom floor, transversely spaced side walls, and an upper roof, said vehicle seat assembly comprising:
   a seat cushion assembly having a seat cushion frame structure, said seat cushion assembly being constructed and arranged to be mounted within the interior space of the motor vehicle in an operative position wherein an occupant can be seated thereon;
   a seat back assembly having a lightweight seat back frame structure, said seat back assembly being constructed and arranged to be mounted within the interior space of the motor vehicle in an operative position to support the back of an occupant seated on the seat cushion assembly, said seat back frame structure including elongated transversely spaced frame members constructed and arranged to be connected with the interior structure of the motor vehicle such that said seat back assembly can be swung between the operative position thereof and a storage position thereof, said seat back assembly being disposed alongside the roof of the motor vehicle in vertically spaced relation to the vehicle floor when in the storage position thereof, said seat back frame structure being associated with said seat cushion frame structure to be disposed below upper portions of said transversely spaced frame members when said seat cushion assembly and seat back assembly are in the operative positions thereof, wherein each of said seat cushion assembly and seat back assembly is moveable from the respective operative positions thereof into respective storage positions such that cargo can be stored on the floor of the motor vehicle when said seat cushion assembly and seat back assembly are in the respective storage positions;
   said seat assembly being constructed and arranged to be connected with and extend between lower portions of the side walls of the motor vehicle when said seat cushion assembly and seat back assembly are in the respective operative positions thereof so that force applied thereto by an occupant during conditions of sudden acceleration or deceleration are resisted by virtue of the connections thereof with the side wall of the motor vehicle.

14. A vehicle seat assembly according to claim 13 including an elongated tensile structure constructed and arranged to be connected with and extend between the side walls of the motor vehicle when said seat cushion assembly and seat back assembly are in the respective operative positions thereof,
   said seat assembly being constructed and arranged such that force applied to said seat assembly results in bending of said seat assembly applies tension to said tensile structure when connected between the side walls of the motor vehicle to thereby resist further bending.

15. A vehicle seat assembly according to claim 14 wherein the storage positions of said seat cushion assembly and seat back assembly are within the interior space of the motor vehicle.

16. A vehicle seat assembly according to claim 1 wherein said seat cushion frame structure is lightweight and said seat back frame structure is associated with said seat cushion frame structure to form a lightweight cushion associated frame structure;
   said seat cushion assembly being moveably mounted to said seat back assembly such that said seat cushion assembly can be moved when said seat back assembly is in the operative position thereof from the operative position thereof to a folded position with respect to said seat back assembly wherein said seat cushion assembly is disposed alongside said seat back assembly so that thereafter said seat back assembly and said seat cushion assembly can be swung upwardly together with said seat cushion assembly in the folded position thereof to the storage positions thereof wherein said seat back assembly and said seat cushion assembly are both disposed alongside the roof of the motor vehicle.

17. A vehicle seat assembly according to claim 16 wherein said seat cushion assembly establishes a connection with the side walls of the motor vehicle as said seat cushion assembly is moved from the folded position thereof to the operative position thereof after said seat back assembly has been swung downwards to the operative position thereof to retain said seat cushion assembly and seat back assembly in the respective operative positions thereof.

18. A vehicle seat assembly according to claim 17 wherein said seat back assembly comprises:
   a pair of seat back sections constructed and arranged to be moved between (1) seat back section operating positions wherein the back of an occupant seated on said seat cushion assembly in the operative position thereof is supported by an associated one of said seat back sections and (2) seat back section deployed positions wherein each of said seat back sections is disposed alongside an associated one of the side walls of the motor vehicle such that (1) elongated articles of cargo can be stored in the interior space of the motor vehicle by laying the articles across the seating surface of the seat cushion assembly and between the seat back sections in a longitudinal direction of the motor vehicle when said seat back sections are in the respective deployed positions thereof and said seat cushion assembly is in the operative position thereof and (2) passage between portions of the vehicle located forwardly and rearwardly of the vehicle seat assembly is allowed when said vehicle seat assembly is mounted within the interior space of the vehicle with said seat back sections in the respective deployed positions thereof and said seat cushion assembly in the operative position thereof.

19. A vehicle seat assembly according to claim 17 including:
   operative position retaining structure constructed and arranged to cooperate with the interior structure of the motor vehicle thereof to retain said seat cushion assembly and seat back assembly in the respective operative positions thereof; and seat back storage position retaining structure constructed and arranged to cooperate with the interior structure of the motor vehicle thereof to retain said seat cushion assembly and seat back assembly in the respective storage positions thereof alongside the roof of the vehicle.

20. A vehicle seat assembly according to claim 18 including:

operative position retaining structure constructed and arranged to cooperate with the interior structure of the motor vehicle to retain said seat cushion assembly and seat back assembly in the respective operative positions thereof;

seat back storage position retaining structure constructed and arranged to cooperate with the interior structure of the motor vehicle at upper parts thereof to retain said seat cushion assembly and seat back assembly in the respective storage positions thereof alongside the roof of the vehicle;

deployed position retaining structure constructed and arranged to cooperate with the interior structure of the motor vehicle to retain said seat back sections in the respective deployed positions thereof; and operating position retaining structure constructed and arranged to retain said seat back sections in the respective operating positions thereof to thereby realize the operative position of said seat back assembly when both of said seat back sections are in the respective operating positions thereof.

21. A vehicle seat assembly according to claim 19 wherein a seating surface of said seat cushion assembly on which an occupant can be seated has a contour and a back supporting surface of said seat back assembly on which an occupant seated on the seating surface of the seat cushion assembly can rest his back has a contour complementary to the contour of the seating surface such that the aforesaid surfaces of said seat cushion assembly and seat back assembly nest with one another when said seat cushion assembly is disposed alongside said seat back assembly so that said seat cushion assembly and seat back assembly have a reduced vertical profile when disposed in the storage positions thereof alongside the roof of the motor vehicle.

22. A vehicle seat assembly according to claim 20 wherein a seating surface of said seat cushion assembly on which an occupant can be seated has a contour and a back supporting surface of said seat back assembly on which an occupant seated on the seating surface of the seat cushion assembly can rest his back has a contour complementary to the contour of the seating surface when said seat back sections are in the respective operating positions thereof so as to realize the operative position of said seat back assembly such that the aforesaid surfaces of said seat cushion assembly and seat back assembly nest with one another when said seat cushion assembly is disposed alongside said seat back assembly so that said seat cushion assembly and seat back assembly have a reduced vertical profile when disposed in the storage positions thereof alongside the roof of the motor vehicle.

23. A vehicle seat assembly according to claim 19 further comprising:

yieldable cushion supporting structure configured to be connected between said transversely spaced frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said storage position retaining structure of said cushion associated frame structure been disengaged from the interior structure of the motor vehicle and (2) said yieldable cushion supporting structure can control downward movement of said seat cushion assembly and seat back assembly as they are being swung downwardly from the respective storage positions thereof.

24. A vehicle seat assembly according to claim 20 further comprising:

yieldable cushion supporting structure configured to be connected between said transversely spaced frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said storage position retaining structure of said cushion associated frame structure has been disengaged from the interior structure of the motor vehicle and (2) said yieldable support structure can control downward movement of said seat cushion assembly and seat back assembly as they are being swung downwardly from the respective storage positions thereof.

25. A vehicle seat assembly according to claim 19 wherein said tensile structure comprises a tubular frame member extending transversely across said cushion associated frame structure, said tubular frame member having a tensile element mounted therein, said frame member being constructed and arranged such that force applied to said frame member results in a bending of said frame member within the elastic limit of the material thereof, said tensile element being constructed and arranged such that the aforesaid bending of said frame member applies tension to said tensile element when said tensile structure is connected between the side walls of the motor vehicle to thereby resist further bending of the frame member caused by the occupant during conditions of sudden acceleration or deceleration.

26. A vehicle seat assembly according to claim 25 wherein said tensile element is a flexible member tautly mounted within said frame member between a pair of tensile element mounting structures extending inwardly into said frame member.

27. A vehicle seat assembly according to claim 26 wherein said tensile structure further comprises:

tensile load transmitting pins extending outwardly from opposing sides of said cushion associated frame structure, said tensile load transmitting pins being constructed and arranged to be received in pin receiving structures disposed on the side walls of the motor vehicle at lower portions thereof when said seat cushion assembly and seat back assembly are in the operative position thereof, said tensile element being operatively communicated with said load transmitting pins through said tensile element mounting structures extending inwardly into said frame member such that the aforesaid bending of said frame member applies tension to said tensile element when said tensile load transmitting pins are received in the pin receiving structures disposed on the side walls of the motor vehicle to thereby resist further bending of the frame member caused by the occupant during conditions of sudden acceleration or deceleration.

28. A vehicle seat assembly according to claim 27 wherein said tensile element is a belt.

29. A vehicle seat assembly according to claim 27 wherein said tensile element mounting structures are eye bolts extending inwardly into said frame member.

30. A vehicle seat assembly according to claim 27 wherein said tensile element is operatively communicated with said tensile force transmitting pins through said tensile element mounting structures by virtue of a bracket which pivotally connects said seat cushion assembly to said seat back assembly and interconnects said tensile force transmitting pins in force transmitting relation with said tensile element mounting structures.

31. A vehicle seat assembly according to claim 20 wherein said tensile structure comprises a tubular frame member extending transversely across said cushion associated frame structure, said tubular frame member having a tensile element mounted therein, said frame member being constructed and arranged such that force applied to said frame member results in a bending of said frame member within the elastic limit of the material thereof, said tensile element being constructed and arranged such that the aforesaid bending of said frame member applies tension to said tensile element when said tensile structure is connected between the side walls of the motor vehicle to thereby resist further bending of the frame member.

32. A vehicle seat assembly according to claim 31 wherein said tensile element is a flexible member tautly mounted within said frame member between a pair of tensile element mounting structures extending inwardly into said frame member.

33. A vehicle seat assembly according to claim 32 wherein said tensile structure further comprises:

tensile load transmitting pins extending outwardly from opposing sides of said cushion associated frame structure, said tensile load transmitting pins being constructed and arranged to be received in pin receiving structures disposed on the side walls of the motor vehicle at lower portions thereof when said seat cushion assembly and seat back assembly are in the operative position thereof, said tensile element being operatively communicated with said load transmitting pins through said tensile element mounting structures extending inwardly into said frame member such that the aforesaid bending of said frame member applies tension to said tensile element when said tensile load transmitting pins are received in the pin receiving structures disposed on the side walls of the motor vehicle to thereby resist further bending of the frame member.

34. A vehicle seat assembly according to claim 33 wherein said tensile element is a belt.

35. A vehicle seat assembly according to claim 33 wherein said tensile element mounting structures are eye bolts extending inwardly into said frame member.

36. A vehicle seat assembly according to claim 33 wherein each of said tensile element mounting structures and said tensile force transmitting pins are operatively communicated by virtue of a bracket which pivotally connects said seat cushion assembly to said seat back assembly and interconnects said tensile force transmitting pins in force transmitting relation with said tensile mounting structures.

37. A vehicle seat assembly according to claim 27 further comprising:

yieldable cushion supporting structure configured to be connected between said transversely spaced side frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said storage position retaining structure of said cushion associated frame structure has been disengaged from the interior structure of the motor vehicle and (2) said yieldable cushion supporting structure can control downward movement of said seat cushion assembly and seat back assembly as they are being swung downwardly from the respective storage positions thereof.

38. A vehicle seat assembly according to claim 33 further comprising:

yieldable cushion supporting structure configured to be connected between said transversely spaced side frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said storage position retaining structure of said cushion associated frame structure has been disengaged from the interior structure of the motor vehicle and (2) said yieldable cushion supporting structure can control downward movement of said seat cushion assembly and seat back assembly as they are being swung downwardly from the respective storage positions thereof.

39. A vehicle seat assembly according to claim 33 wherein the seating surface of said seat cushion assembly on which an occupant can be seated has a contour and the back supporting surface of said seat back assembly on which an occupant seated on the seating surface of the seat cushion assembly can rest his back has a contour complementary to the contour of the seating surface when said seat back sections are in the respective operating positions thereof such that the aforesaid surfaces of said seat cushion assembly and seat back assembly nest with one another when said seat cushion assembly is disposed alongside said seat back assembly so that said seat cushion assembly and seat back assembly have a reduced vertical profile when disposed in the storage positions thereof alongside the roof of the motor vehicle.

40. A vehicle seat assembly according to claim 19 wherein the seating surface of said seat cushion assembly on which an occupant can be seated has a contour and the back supporting surface of said seat back assembly on which the occupant seated on the seating surface of the seat cushion assembly can rest his back has a contour complementary to the contour of the seating surface such that the aforesaid surfaces of said seat cushion assembly and seat back assembly nest with one another when said seat cushion assembly is disposed alongside said seat back assembly so that said seat cushion assembly and seat back assembly have a reduced vertical profile when disposed in the storage positions thereof alongside the roof of the motor vehicle.

41. A vehicle seat assembly according to claim 19 wherein said seat cushion assembly has a lightweight construction comprising a membrane stretched over said light seat cushion frame structure, a thin foam cushion disposed on said membrane, and a cover covering said seat cushion assembly, said seat back assembly having a lightweight construction comprising a membrane stretched over said lightweight seat back frame structure, a thin foam cushion disposed on said membrane, and a cover covering said seat back assembly.

42. A vehicle seat assembly according to claim 27 wherein said seat cushion assembly has a lightweight construction comprising a membrane stretched over said light seat cushion frame structure, a thin foam cushion disposed on said membrane, and a cover covering said seat cushion assembly, said seat back assembly having a lightweight construction comprising a membrane stretched over said lightweight seat back frame structure, a thin foam cushion disposed on said membrane, and a cover covering said seat back assembly.

43. A vehicle seat assembly according to claim 20 wherein said seat cushion assembly has a lightweight construction comprising a membrane stretched over said light seat cushion frame structure, a thin foam cushion disposed on said membrane, and a cover covering said seat cushion assembly, each of said seat back sections having a lightweight construction comprising a membrane stretched over a seat back frame section of said lightweight seat back frame structure associated with one of said seat back sections, a thin foam cushion disposed on said membrane, and a cover covering the associated one of said seat back sections.

44. A vehicle seat assembly according to claim 33 wherein said seat cushion assembly has a lightweight construction comprising a membrane stretched over said light seat cushion frame structure, a thin foam cushion disposed on said membrane, and a cover covering said seat cushion assembly, each of said seat back sections having a lightweight construction comprising a membrane stretched over a seat back frame section of said lightweight seat back frame structure associated with one of said seat back sections, a thin foam cushion disposed on said membrane, and a cover covering the associated one of said seat back sections.

45. A vehicle seat assembly according to claim 28 wherein said yieldable cushion supporting structure includes at least one gas strut constructed and arranged to be pivotally connected between said elongated transversely spaced frame members extending downwardly from the roof of the motor vehicle when said seat back assembly is in the operative position thereof and rearward portions of the side walls of the motor vehicle when said vehicle seat assembly is mounted within the interior space of the motor vehicle, said gas strut being constructed and arranged such that (1) said gas strut can yieldingly support said set cushion assembly and seat back assembly in the storage positions thereof alongside the roof of the motor vehicle after said storage position retaining structure has been disengaged from the interior structure of the motor vehicle and (2) said gas strut control downward movement of said seat cushion assembly and seat back assembly as they are being swung downwardly from the respective storage positions thereof.

46. A vehicle seat assembly according to claim 24 wherein said yieldable cushion supporting structure includes at least one gas strut constructed and arranged to be pivotally connected between said elongated transversely spaced frame members extending downwardly from the roof of the motor vehicle when said seat back assembly is in the operative position thereof and rearward portions of the side walls of the motor vehicle when said vehicle seat assembly is mounted within the interior space of the motor vehicle, said gas strut being constructed and arranged such that (1) said gas strut can yieldingly support said seat cushion assembly and seat back assembly in the respective storage positions thereof alongside the roof of the motor vehicle after storage position retaining structure has been disengaged from the interior structure of the motor vehicle and (2) control downward movement of said seat cushion assembly and seat back assembly as they are being swung downwardly from the respective storage positions thereof.

47. A vehicle seat assembly according to claim 27 constructed and arranged to have a seat belt assembly mounted thereto when said seat cushion assembly and seat back assembly are in the operative position thereof such that movement of an occupant wearing the seat belt assembly away from said seat back assembly during conditions of sudden acceleration or deceleration is resisted, portions of said seat belt assembly being connected to said tubular frame member of said tensile structure such that movement of the occupant away from said seat back assembly causes the aforesaid bending of said frame member during conditions of sudden acceleration or deceleration.

48. A vehicle seat assembly according to claim 33 constructed and arranged to have a seat belt assembly mounted thereto when said seat cushion assembly and seat back assembly are in the operative position thereof, portions of said seat belt assembly being connected to said tubular frame member of said tensile structure.

49. A vehicle seat assembly according to claim 19 wherein a pair of latch assemblies mounted on said seat cushion frame assembly face downwardly towards the floor of the motor vehicle when said seat cushion assembly is in the operative position thereof, said pair of latch assemblies constituting both said seat back storage position retaining structure and said operative position retaining structure of said seat assembly, said latch assemblies being constructed and arranged to (1) engage the interior structure of the motor vehicle to retain said seat cushion assembly and seat back assembly in the respective operating positions thereof and (2) engage the interior structure of the motor vehicle to retain said seat cushion assembly and seat back assembly in the respective storage positions thereof alongside the roof of the motor vehicle, said latching assemblies being operable so as to disengage from the interior structure of the motor vehicle, thereby allowing said seat cushion assembly and seat back assembly to be moved between the respective operative and storage positions thereof.

50. A vehicle seat assembly according to claim 20 wherein a pair of latch assemblies mounted on said seat cushion frame assembly face downwardly towards the floor of the motor vehicle when said seat cushion assembly is in the operative position thereof, said pair of latch assemblies constituting both said seat back storage position retaining structure and said operative position retaining structure of said seat assembly, said latch assemblies being constructed and arranged to (1) engage the interior structure of the motor vehicle to retain said seat cushion assembly and seat back assembly in the respective operating positions thereof and (2)

engage the interior structure of the motor vehicle to retain said seat cushion assembly and seat back assembly in the respective storage positions thereof alongside the roof of the motor vehicle, said latching assemblies being operable so as to disengage from the interior structure of the motor vehicle, thereby allowing said seat cushion assembly and seat back assembly to be moved between the respective operative and storage positions thereof.

51. A vehicle seat assembly according to claim 49 including:

an actuating assembly disposed on said cushion associated frame structure at a manually accessible position wherein said actuating assembly can be manually operated when said seat cushion assembly and seat back assembly are in either of the respective operative or storage positions thereof, said actuating assembly being constructed and arranged such that manual operation thereof disengages said latching assemblies from the interior structure of the motor vehicle when said seat cushion assembly and seat back assembly are in either of the respective operative or storage positions thereof to thereby allow said seat cushion assembly and seat back assembly to be moved between the respective storage and operative positions thereof.

52. A vehicle seat assembly according to claim 50 including:

an actuating assembly disposed on said cushion associated frame structure at a manually accessible position wherein said actuating assembly can be manually operated when said seat cushion assembly and seat back assembly are in either of the respective operative or storage positions thereof, said actuating assembly being constructed and arranged such that manual operation thereof disengages said latching assemblies from the interior structure of the motor vehicle when said seat cushion assembly and seat back assembly are in either of the respective operative or storage positions thereof to thereby allow said seat cushion assembly and seat back assembly to be moved between the respective storage and operative positions thereof.

53. A vehicle seat assembly according to claim 20 wherein said deployment position retaining structure comprises a pair of deployment latching assemblies each disposed on a seat back frame section of said seat back frame structure associated with one of said seat back sections, said deployment latching assemblies facing away from said seat cushion assembly when said seat back sections are in the respective operating positions thereof, said deployment latching assemblies being constructed and arranged to engage the interior structure of the motor vehicle to retain said seat back sections in the respective deployed positions thereof;

said operating position retaining structure comprising striker structure and a pair of operating latch assemblies each disposed on a seat back frame section of said seat back frame structure associated with one of said seat back sections, said operating latch assemblies facing towards said seat cushion assembly when said seat back sections are in the respective operating positions thereof, said operating latch assemblies being constructed and arranged to engage said striker structure and retain said seat back sections in the respective operating positions thereof to thereby realize said operative position of said seat back assembly when both of said seat back sections are in the respective operating positions thereof.

54. A vehicle seat assembly according to claim 19 wherein said elongated tensile structure extends transversely across said seat cushion frame structure.

55. A vehicle seat assembly according to claim 20 wherein said elongated tensile structure extends transversely across said seat back frame structure.

56. A vehicle seat assembly in combination with a motor vehicle having an interior space defined by a bottom floor, transversely spaced side walls, and an upper roof, said vehicle seat assembly comprising:

a seat cushion assembly having a seat cushion frame structure, said seat cushion assembly being constructed and arranged to be mounted within the interior space of the motor vehicle in an operative position wherein an occupant can be seated thereon;

a seat back assembly having a lightweight seat back frame structure, said seat back assembly being constructed and arranged to be mounted within the interior space of the motor vehicle in an operative position to support the back of an occupant seated on the seat cushion assembly, said seat back frame structure including elongated transversely spaced frame members constructed and arranged to be pivotally connected with the interior structure of the motor vehicle adjacent the roof thereof and extend downwardly therefrom when said seat back assembly is in the operative position thereof such that said seat back assembly can be swung between the operative position thereof and the storage position thereof, said seat back assembly being disposed alongside the roof of the motor vehicle in vertically spaced relation to the vehicle floor when in the storage position thereof, said seat back frame structure being associated with said seat cushion frame structure disposed below upper portions of said transversely spaced frame members when said seat cushion assembly and seat back assembly are in the operative positions thereof, said seat assembly being constructed and arranged to be connected with and extend between lower portions of the side walls of the motor vehicle when said seat cushion assembly and seat back assembly are in the respective operative positions thereof and including an elongated tensile structure constructed and arranged to be connected with and extending between the side walls of the motor vehicle when said seat cushion assembly and seat back assembly are in the respective operative positions thereof such that force applied to said cushion associated frame structure results in bending of said cushion associated frame structure within the elastic limit of the material thereof, said tensile structure being constructed and arranged such that the aforesaid bending of said cushion associated frame structure causes said tensile structure to apply inwardly directed tensile forces to the side walls of the motor vehicle when said tensile structure is connected there between, said side walls of the motor vehicle being constructed and arranged to resist the inwardly directed tensile forces so that tension is created in said tensile structure as a result of the aforesaid bending such that said tensile structure resists further bending.

57. A combination according to claim 56 wherein each of said seat cushion assembly and seat back assembly is moveable from the respective operative positions thereof into respective storage positions such that cargo can be stored on the floor of the motor vehicle when said seat cushion assembly and seat back assembly are in the respective storage positions.

58. A combination according to claim 57 wherein the storage positions of said seat cushion assembly and seat back assembly are within the interior space of the motor vehicle.

59. A combination according to claim 57 wherein said seat cushion frame structure is lightweight and said seat back frame structure is lightweight and said seat back frame structure is associated with said seat cushion frame structure to form a lightweight structure, said seat cushion assembly being moveably mounted to said seat back assembly such that said seat cushion assembly can be moved when said seat back assembly is in the operative position thereof from the operative position thereof to a folded position with respect to said seat back assembly wherein said seat back assembly so that thereafter said seat back assembly and said seat cushion assembly can be swung upwardly together with said seat cushion assembly in the folded position thereof to the storage positions thereof wherein said seat back assembly and said seat cushion assembly are both disposed alongside the roof of the motor vehicle.

60. A combination according to claim 59 wherein said seat cushion assembly establishes a connection with the side walls of the motor vehicle as said seat cushion assembly is moved from the folded position thereof to the operative position thereof after said seat back assembly has been swung downwards to the operative position thereof to retain said seat cushion assembly and seat back assembly in the respective operative positions thereof.

61. A combination according to claim 60 wherein a seating surface of said seat cushion assembly on which an occupant can be seated has a contour and a back supporting surface of said seat back assembly on which an occupant seated on the seating surface of the seat cushion assembly can rest his back has a contour complementary to the contour of the seating surface such that the aforesaid surfaces of said seat cushion assembly and seat back assembly nest with one another when said seat cushion assembly is disposed alongside said seat back assembly so that said seat cushion assembly and seat back assembly have a reduced vertical profile when disposed in the storage positions thereof alongside the roof of the motor vehicle.

62. A combination according to claim 60 including:
operative position retaining structure constructed and arranged to cooperate with the interior structure of the motor vehicle to thereby retain said seat cushion assembly and seat back assembly in the respective operative positions thereof; and
storage position retaining structure constructed an arranged to cooperate with the interior structure at upper portions thereof to thereby retain said seat cushion assembly and seat back assembly in the respective storage positions thereof alongside the roof of the motor vehicle.

63. A combination according to claim 62 further comprising:
yieldable cushion supporting structure configured to be connected between said transversely spaced frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said storage position retaining structure has been disengaged from the interior structure of the motor vehicle and (2) said yieldable cushion support structure can control downward movement of said seat cushion assembly and seat back assembly as they are being swung downwardly from the respective storage positions thereof.

64. A combination according to claim 60 wherein said tensile structure comprises a tubular frame member extending transversely across said cushion associated frame structure, said tubular frame member having a tensile element tautly mounted therein,
said frame member being constructed and arranged such that force applied to said frame member results in a bending of said frame member within the elastic limit of the material thereof, said tensile element being constructed and arranged such that the aforesaid bending of said frame member applies tension to said tensile element when said tensile structure is connected between the side walls of the motor vehicle to thereby resist further bending of the frame member.

65. A combination according to claim 64 wherein said tensile element is a flexible member tautly mounted within said frame member between a pair of tensile element mounting structures extending inwardly into said frame member.

66. A combination according to claim 65 wherein said tensile structure further comprises:
tensile load transmitting pins extending outwardly from opposing sides of said cushion associated frame structure, said tensile load transmitting pins being constructed and arranged to be received in pin receiving structures disposed on the side walls of the motor vehicle at lower portions thereof when said seat cushion assembly and seat back assembly are in the operative position thereof, said tensile element being operatively communicated with said load transmitting pins through said tensile element mounting structures extending inwardly into said frame member such that the aforesaid bending of said frame member applies tension to said tensile element when said tensile load transmitting pins are received in the pin receiving structures disposed on the side walls of the motor vehicle to thereby resist further bending of the frame member caused by the occupant during conditions of sudden acceleration or deceleration.

67. A combination according to claim 66 wherein said tensile element is a belt.

68. A combination according to claim 66 wherein said tensile element mounting structures are eye extending inwardly into said frame member.

69. A combination according to claim 64 wherein said seat cushion assembly has a lightweight construction comprising a membrane stretched over said light seat cushion frame structure, a thin foam cushion disposed on said membrane, and a cover covering said seat cushion assembly,
said seat back assembly having a lightweight construction comprising a membrane stretched over said lightweight seat back frame structure, a thin foam cushion disposed on said membrane, and a cover covering said seat back assembly.

70. A combination according to claim 63 wherein said yieldable cushion supporting structure is at least one constructed and arranged to be pivotally connected between said elongated transversely spaced frame members extending downwardly from the roof of the motor vehicle when said seat back assembly is in the operative position thereof and rearward portions of the side walls of the motor vehicle when said vehicle seat assembly is mounted within the interior space of the motor vehicle, said gas strut being constructed and arranged such that (1) said gas strut can yieldingly support said seat cushion assembly and seat back assembly in the respective storage positions thereof alongside the roof of the motor vehicle after said storage position retaining structure has been disengaged from the interior structure of the motor vehicle and (2) control downward movement of said seat cushion assembly and seat back assembly as they are being swung downwardly from the respective storage positions thereof.

71. A combination according to claim 64 wherein said seat assembly is constructed and arranged to have a seat belt assembly mounted thereto when said seat cushion assembly and seat back assembly are in the operative positions such that movement of an occupant wearing said set belt assembly away from said seat back assembly during conditions of sudden acceleration or deceleration is resisted, portions of said seat belt assembly being connected to said tubular frame member of said tensile structure such that movement of the occupant away from said seat back assembly during conditions of sudden acceleration or deceleration causes the aforesaid bending of said frame member.

72. A combination according to claim 61 wherein the interior structure of the motor vehicle comprises vehicle operating condition actuated locking structure configured to sense vehicle operating conditions, said vehicle operating condition actuated locking structure being constructed and arranged to lock said seat cushion assembly and seat back assembly in the respective storage positions thereof alongside the roof of the vehicle when the vehicle operating condition actuated locking structure senses a first predetermined vehicle operating condition and to unlock said seat cushion assembly and seat back assembly to permit for movement of said seat cushion assembly and seat back assembly from the respective storage positions thereof when the vehicle operating condition actuated locking structure senses a second predetermined vehicle operating condition.

73. A combination according to claim 72 wherein the motor vehicle includes a pin receiving opening formed on the interior structure adjacent the roof thereof, at least one retractable pin portion disposed on one of the opposing sides thereof, said retractable pin portion being constructed and arranged to be extended and retracted between an extend position for being received in said pin receiving opening when said seat cushion assembly and seat back assembly are disposed in the respective storage positions thereof alongside the roof of the motor vehicle so that said seat cushion assembly and seat back assembly are prevented from swinging downwardly from the respective storage positions thereof, and a retracted position wherein said retractable pin portion is withdrawn from said pin receiving opening when said seat cushion assembly and seat back assembly are in the respective storage positions thereof so that said seat cushion assembly and seat back assembly can be swung downwardly from the respective storage positions thereof, said vehicle operating condition locking structure including at least one solenoid mounted on the side wall of the motor vehicle, said solenoid having a Y-shaped piston movable between (1) an extended position wherein the Y-shaped piston engages said retractable pin portion of the cushion associated frame structure of the vehicle seat assembly when in the extended position thereof and received in the pin receiving opening when said seat cushion assembly and seat back assembly are in the respective storage positions thereof alongside the roof of the motor vehicle so that said retractable pin portion is prevented from being withdrawn from the pin receiving opening to thereby lock said seat cushion assembly and seat back assembly in the respective storage positions thereof alongside the roof of the vehicle and (2) a retracted position wherein the Y-shaped piston is disengaged from the retractable pin portion of the cushion associated frame structure so that said retractable pin portion can be withdrawn from the pin receiving opening to thereby unlock said seat cushion assembly and seat back assembly and permit movement of said seat cushion assembly and seat back assembly from the respective storage positions thereof.

74. A vehicle seat assembly in combination with a motor vehicle having an interior space defined by a bottom floor, transversely spaced side walls, and an upper roof, said vehicle seat assembly comprising:

a seat cushion assembly having a lightweight seat cushion frame structure, said seat cushion assembly being constructed and arranged to be mounted within the interior space of the motor vehicle in an operative position wherein an occupant can be seated thereon;

a seat back assembly having a lightweight seat back frame structure, said seat back assembly being constructed and arranged to be mounted within the interior space of the motor vehicle in an operative position to support the back of an occupant seated on the seat cushion assembly, said seat back frame structure including elongated transversely spaced frame members constructed and arranged to be connected with the interior structure of the motor vehicle adjacent the roof thereof and extend downwardly therefrom when said seat back assembly is in the operative position thereof, said seat back frame structure being associated with said seat cushion frame structure to form a lightweight structure disposed below upper portions of said transversely spaced frame members when said seat cushion assembly and seat back assembly are in the operative positions thereof, said seat cushion assembly being moveably mounted to said seat back assembly such that said seat cushion assembly can be moved when said seat back assembly is in the operative position thereof to a folded position with respect to said seat back assembly wherein said seat cushion assembly is disposed alongside said seat back assembly, said transversely spaced frame members of said seat back frame structure being constructed and arranged to be pivotally attached to the interior structure of the motor vehicle such that said seat cushion assembly can be moved to the folded position thereof alongside said seat back assembly and thereafter said seat back assembly together with said seat cushion assembly can be swung upwards to be releasably retained in respective storage positions wherein said seat cushion assembly and seat back assembly are disposed alongside the roof of the motor vehicle in vertically spaced relation to the floor of the motor vehicle and are capable of being released in response to manual operation for swinging downward movement therefrom, the respective storage positions of said seat cushion assembly and seat back assembly being arranged such that cargo can be stored on the floor of the motor vehicle when said seat cushion assembly and seat back assembly are in the respective storage positions, said cushion associated frame structure being constructed and arranged to establish a connection with the interior structure of the motor vehicle as said seat cushion assembly is moved from the folded position thereof to the operative position thereof after said seat back assembly has been swung downwards to the operative position thereof to retain said seat cushion assembly and seat back assembly in the respective operative positions thereof; and yieldable cushion supporting structure configured to be connected between said transversely spaced side frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said seat cushion assembly and seat back assembly have been released in response to manual operation and (2) said yieldable cushion supporting structure can control downward movement of said seat cushion assembly and seat back assembly as they are being swung downwardly from the respective storage positions thereof.

75. A vehicle seat assembly in combination with a motor vehicle having an interior space defined by a bottom floor, transversely spaced side walls, and an upper roof, said vehicle seat assembly comprising:

a seat cushion assembly having a lightweight seat cushion frame structure, said seat cushion assembly being constructed and arranged to be mounted within the interior space of the motor vehicle in an operative position wherein an occupant can be seated thereon;

a seat back assembly having a lightweight seat back frame structure, said seat back assembly being constructed and arranged to be mounted within the interior space of the motor vehicle in an operative position to support the back of an occupant seated on the seat cushion assembly, said seat back frame structure including elongated transversely spaced frame members constructed and arranged to be connected with the interior structure of the motor vehicle and extend downwardly therefrom when said seat back assembly is in the operative position thereof, said seat back frame structure being associated with said seat cushion frame structure to form a lightweight structure disposed below upper portions of said transversely spaced frame members when said seat cushion assembly and seat back assembly are in the operative positions thereof, said seat cushion assembly being moveably mounted to said seat back assembly such that said seat cushion assembly can be moved when said seat back assembly is in the operative position thereof to a folded position with respect to said seat back assembly wherein said seat cushion assembly is disposed alongside said seat back assembly, said transversely spaced frame members of said seat back frame structure being constructed and arranged to be pivotally attached to the interior structure of the motor vehicle such that said seat cushion assembly can be moved to the folded position thereof alongside said seat back assembly and thereafter said seat back assembly together with said seat cushion assembly can be swung upwards to be releasably retained in respective storage positions wherein said seat cushion assembly and seat back assembly are disposed alongside the roof of the motor vehicle in vertically spaced relation to the floor of the motor vehicle and are capable of being released in response to manual operation for swinging downward movement therefrom, the respective storage positions of said seat cushion assembly and seat back assembly being arranged such that cargo can be stored on the floor of the motor vehicle when said seat cushion assembly and seat back assembly are in the respective storage positions, said seat assembly being constructed and arranged to establish a connection with the side walls of the motor vehicle as said seat cushion assembly is moved from the folded position thereof to the operative position thereof after said seat back assembly has been swung downwards to the operative position thereof to retain said seat cushion assembly and seat back assembly in the respective operative positions thereof; and yieldable cushion supporting structure configured to be connected between said transversely spaced side frame members of said seat back frame structure and the interior structure of the motor vehicle, said yieldable cushion supporting structure being constructed and arranged such that (1) said yieldable cushion supporting structure can yieldingly support said seat cushion assembly and seat back assembly in the respective storage positions thereof alongside the roof of the motor vehicle after said seat cushion assembly sand seat back assembly have been released in response to manual operation and (2) said yieldable cushion supporting structure can control downward movement of said seat cushion assembly and seat back assembly as they are being swung downwardly from the respective storage positions thereof.

76. A vehicle seat assembly according to claim 74 wherein said yieldable cushion supporting structure includes at least one gas strut constructed and arranged to be pivotally connected between said elongated transversely spaced frame members extending downwardly from the roof of the motor vehicle when said seat back assembly is in the operative position thereof and rearward portions of the side walls of the motor vehicle when said vehicle seat assembly is mounted within the interior space of the motor vehicle, said gas strut being constructed and arranged such that (1) said gas strut can yieldingly support said seat cushion assembly and seat back assembly in the respective storage positions thereof alongside the roof of the motor vehicle after said seat cushion assembly and seat back assembly have been released in response to manual operation and (2) control downward movement of said seat cushion assembly and seat back assembly as they are being swung downwardly from the respective storage positions thereof.

77. A combination according to claim 75 wherein said yieldable cushion supporting structure includes at least one gas strut constructed and arranged to be pivotally connected between said elongated transversely spaced frame members extending downwardly from the roof of the motor vehicle when said seat back assembly is in the operative position thereof and rearward portions of the side walls of the motor vehicle when said vehicle seat assembly is mounted within the interior space of the motor vehicle, said gas strut being constructed and arranged such that (1) said gas strut can yieldingly support said seat cushion assembly and seat back assembly in the respective storage positions thereof alongside the roof of the motor vehicle after said seat cushion assembly and seat back assembly have been released in response to manual operation and (2) control downward movement of said seat cushion assembly and seat back assembly as they are being swung downwardly from the respective storage positions thereof.

* * * * *

UNITED STATES PATENT AND TRADEMARK OFFICE
CERTIFICATE OF CORRECTION

PATENT NO : 6,073,986
DATED : June 13, 2000
INVENTOR(S): Colin G. Neale, Philip W. Hadley, Eric M. Langensiepen It is certified that error appears in the above-identified patent and that said Letters Patent are hereby corrected as shown below:

IN THE CLAIMS:

In Claim 7, column 18, line 61, please delete "to".
In Claim 16, column 20, line 13, please delete "1" and insert --13--.
In Claim 19, column 20, line 67, please delete "thereof".
In Claim 19, column 21, line 5, please delete "thereof".
In Claim 20, column 21, line 18, please delete "at upper parts thereof".
In Claim 45, column 25, line 44, please delete "28" and insert --23--.
In Claim 68, column 30, line 47, please insert --bolts-- after the word "eye".
In Claim 70, column 30, line 60, please insert --gas strut-- after the word "one".
In Claim 75, column 34, line 23, please delete "sand" and insert --and--.

Signed and Sealed this

Seventeenth Day of April, 2001

*Attest:*

NICHOLAS P. GODICI

*Attesting Officer*   Acting Director of the United States Patent and Trademark Office